| ELEMENT | REVERSE | NEUTRAL | D, LOW | INTERM. | HIGH | MAN. LOW |
|---|---|---|---|---|---|---|
| FRONT CLUTCH | | | ON | ON | ON | ON |
| REAR CLUTCH | ON | | | | ON | |
| FRONT BAND | | | | ON | | |
| INTERM. BRAKE | | | | ON | ON | |
| INTERM. O.W.C. | | | | HOLDING | | |
| LOW O.W.C. | | | HOLDING | | | |
| REAR BAND | ON | | | | | ON |

INVENTORS:
RICHARD L. LEONARD
BY FRANK B. GESSLER
ATTORNEYS

Nov. 29, 1966   R. L. LEONARD ET AL   3,287,995
NON-SYNCHRONOUS MULTIPLE SPEED RATIO
POWER TRANSMISSION MECHANISM
Filed Feb. 20, 1963                 7 Sheets-Sheet 3
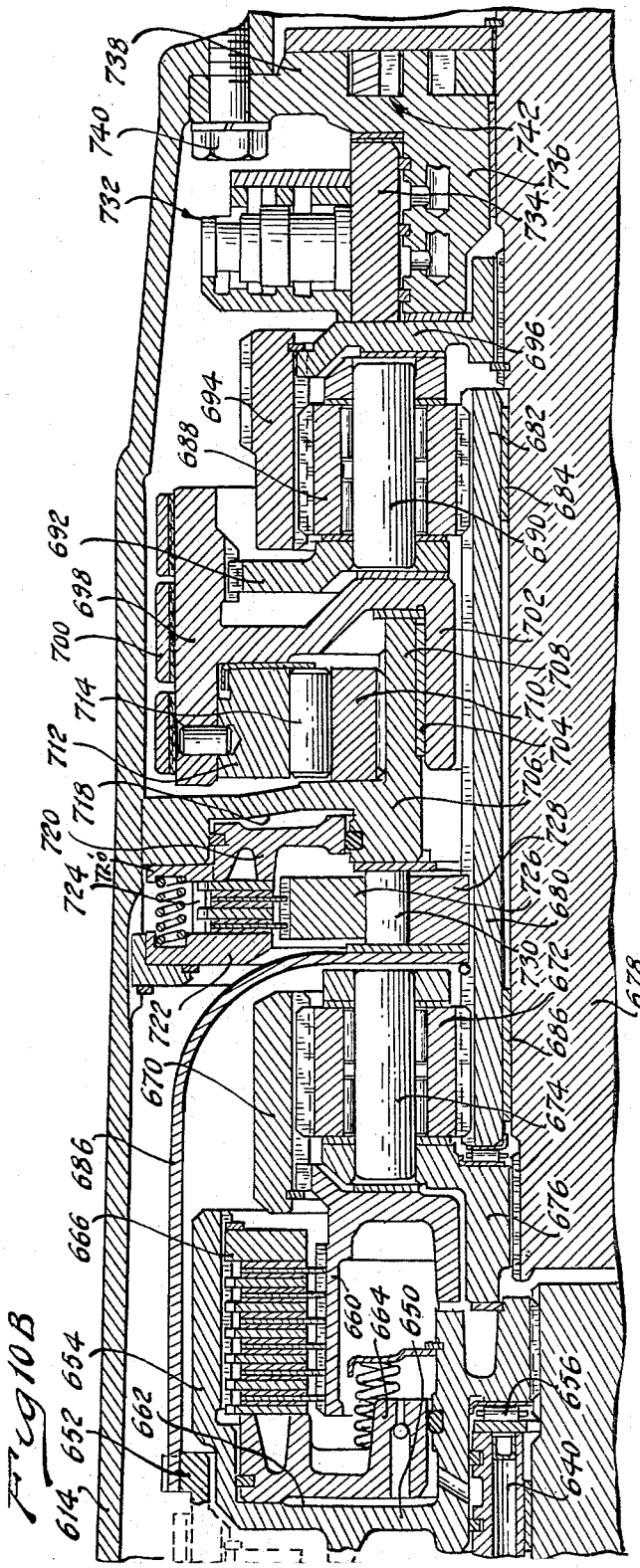
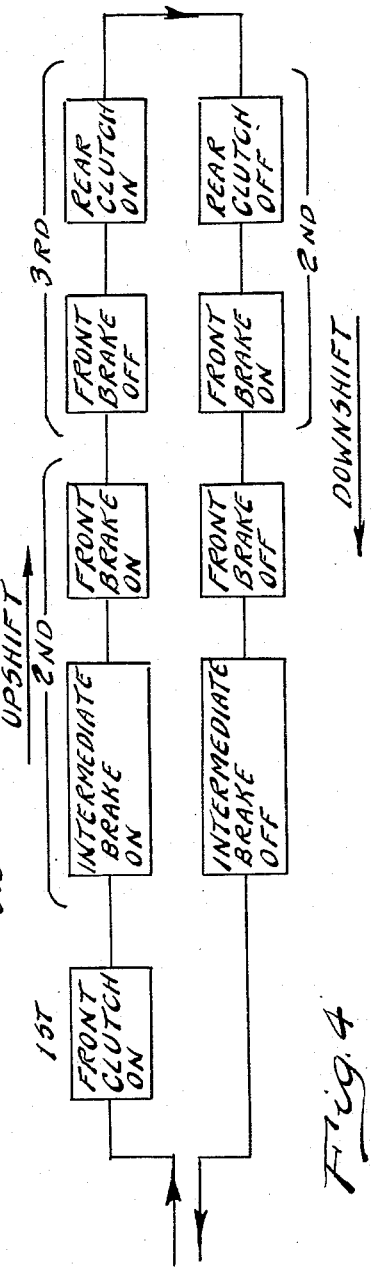
INVENTORS:
RICHARD L. LEONARD
BY FRANK B. GESSLER
ATTORNEYS

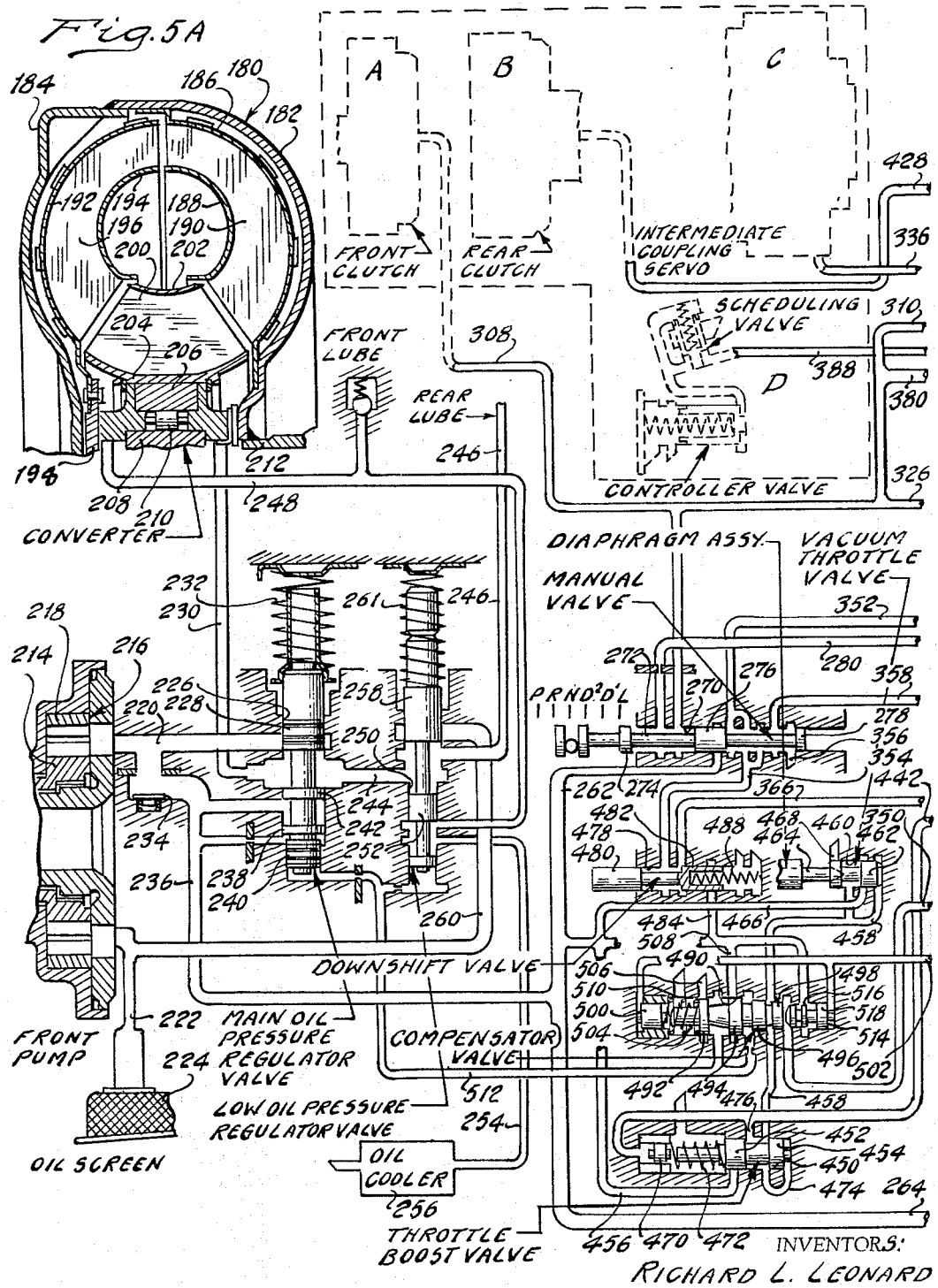

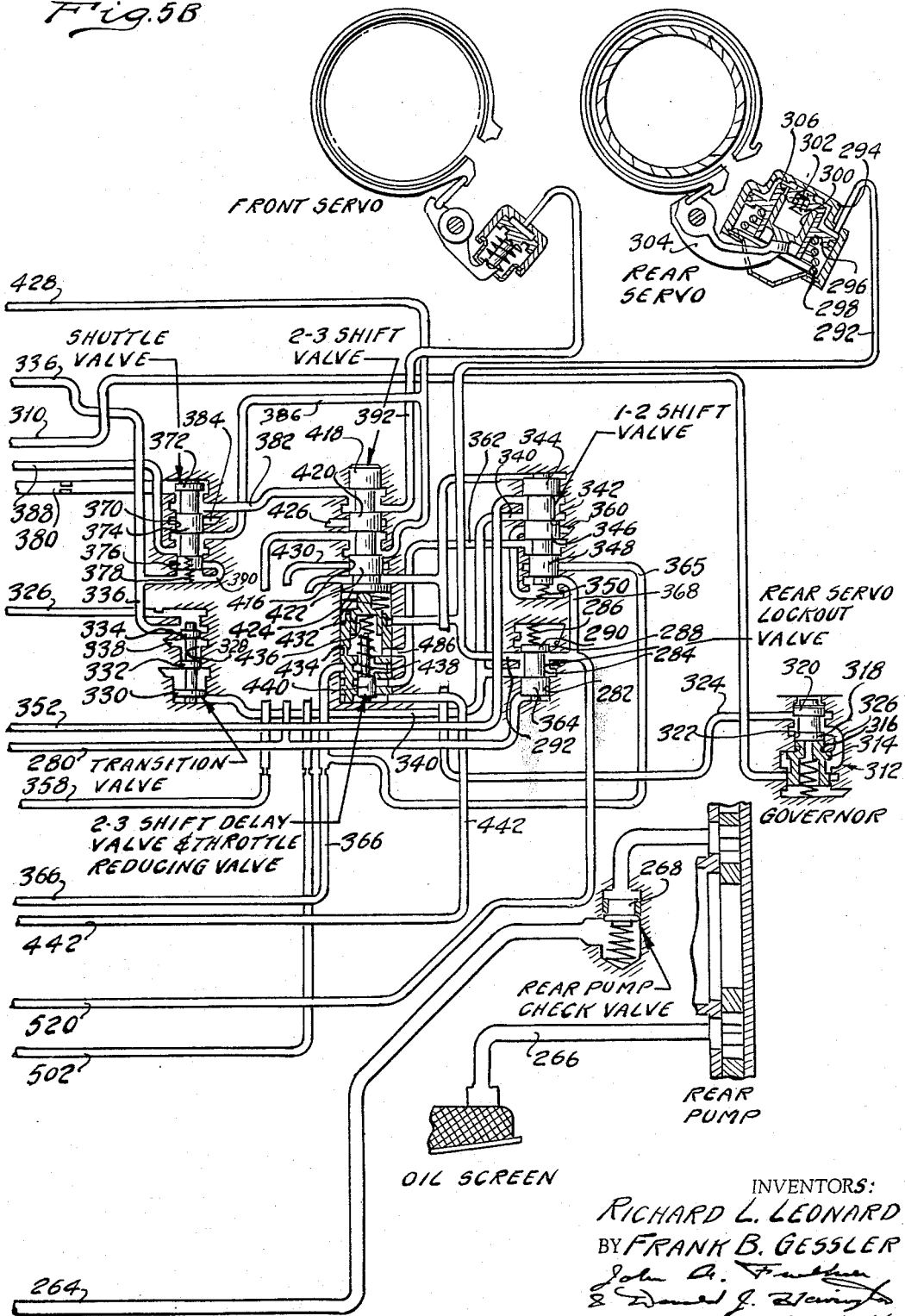

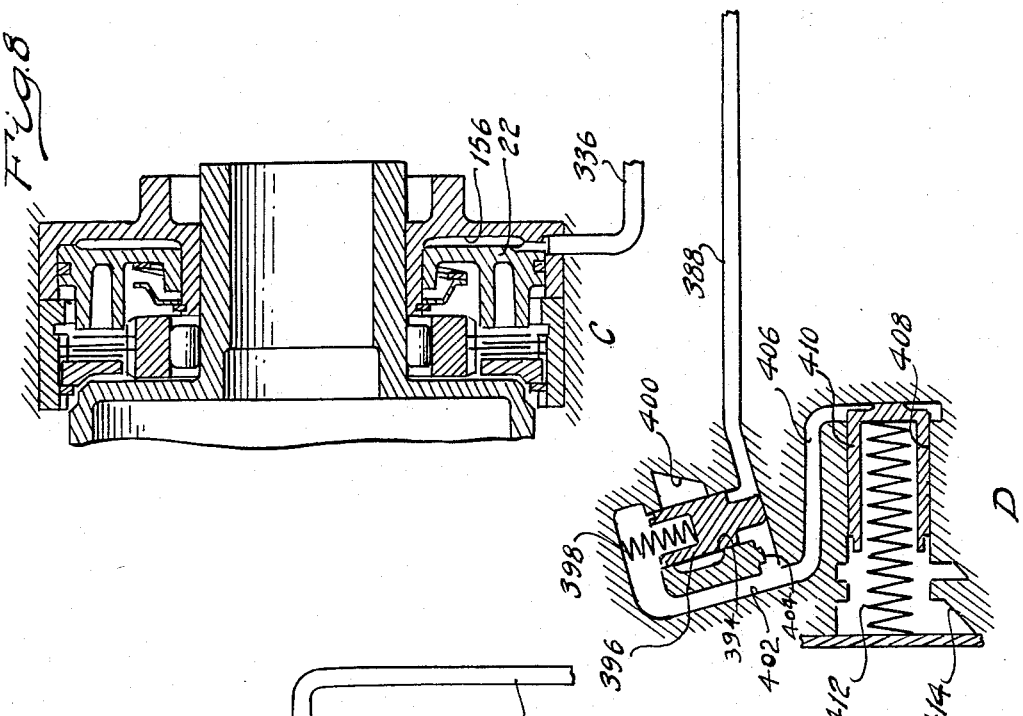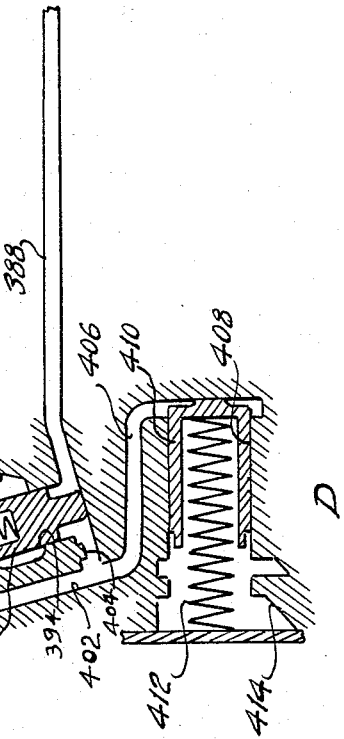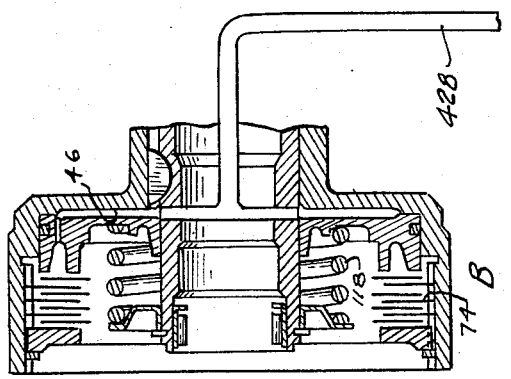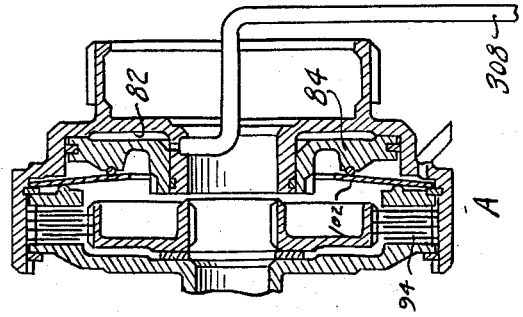

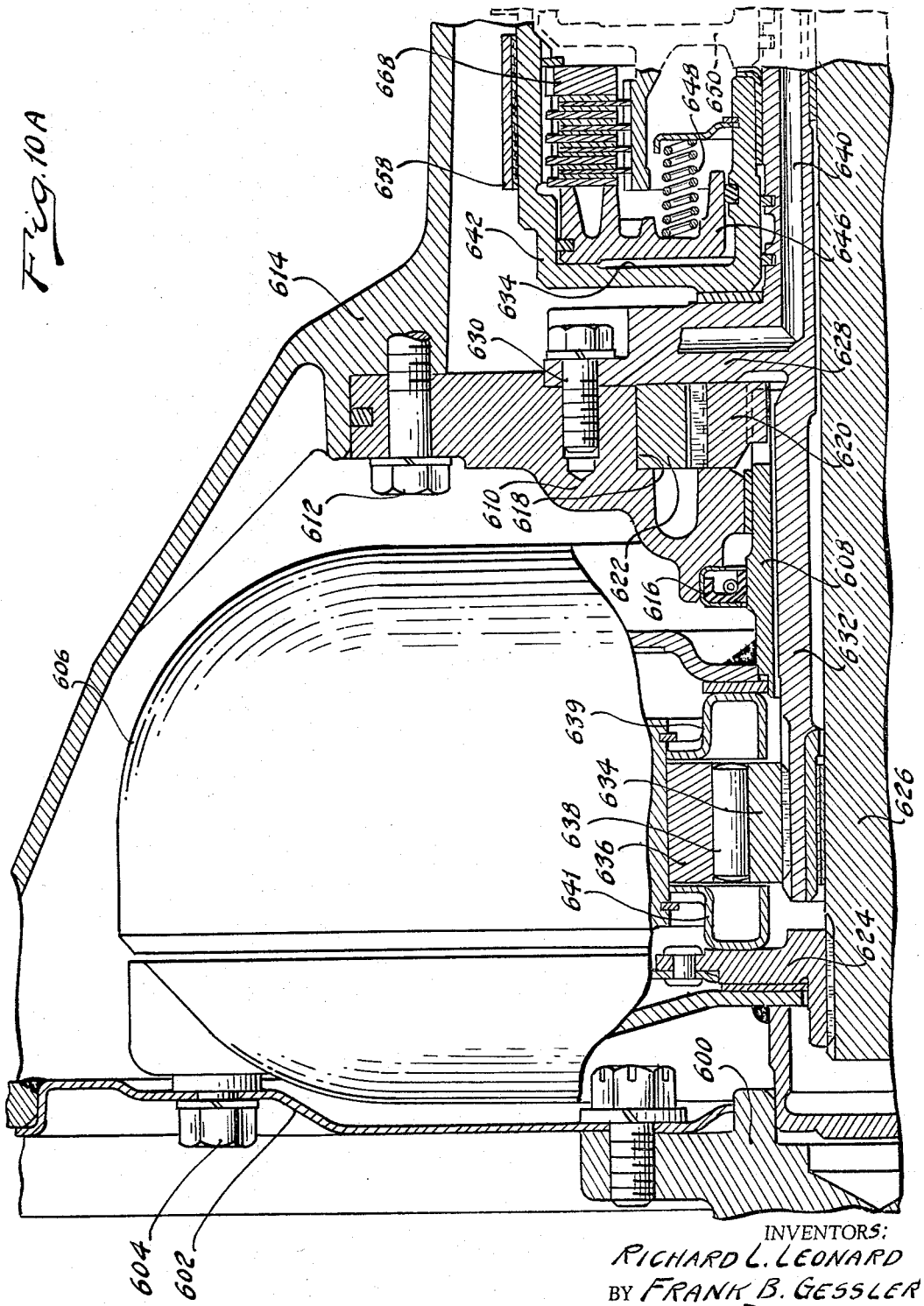

United States Patent Office 3,287,995
Patented Nov. 29, 1966

3,287,995
NON-SYNCHRONOUS MULTIPLE SPEED RATIO
POWER TRANSMISSION MECHANISM
Richard L. Leonard and Frank B. Gessler, Farmington, Mich., assignors to Ford Motor Company, Dearborn, Mich., a corporation of Delaware
Filed Feb. 20, 1963, Ser. No. 259,845
29 Claims. (Cl. 74—763)

Our invention relates generally to automatic servo controllers for power transmission mechanisms and the like and more particularly to improvements in a control system for multiple speed ratio power transmissions that are adapted especially for use in automotive vehicle driveline installations.

The improvements of our invention can be adapted readily for use with a multiple speed ratio power transmission mechanism having servo operated friction couplings that may be applied and released selectively to control the degree of relative motion of the torque delivery elements of the mechanism and to establish any speed ratio to accommodate varying driving conditions. Our invention is adapted particularly to be used in an automotive vehicle power transmission mechanism wherein either one of two reaction gear elements of the mechanism may be conditioned sequentially to establish a low speed ratio and an intermediate speed ratio and to accommodate the accompanying torque reaction. The plural torque delivery paths thus established are defined in part by a selectively engageable clutch.

In a preferred embodiment of our invention, the clutch forms a driving connection between the power input members of a gear unit and a turbine member of a hydrokinetic torque converter unit. The impeller member of the torque converter unit may be coupled drivably to a vehicle engine in the usual fashion. A direct drive high speed ratio can be obtained by engaging a second clutch that couples together the elements of the gear unit to establish a one-to-one driving ratio between the turbine member and the driven member of the transmission mechanism.

The clutch and brake structure of our improved mechanism may be applied in sequence to establish the various speed ratios. A speed ratio shift may be accomplished, however, in a non-synchronous fashion. Thus engagement of one controller servo may be applied without reference to the calibration of the other controller servo that is involved in that speed ratio shift.

We contemplate that the improvements of our invention can be applied readily to a multiple speed ratio power transmission mechanism that comprises a multiple speed ratio planetary gear arrangement, a hydrokinetic torque converter, two clutches and two brakes. The clutches and brakes control the relative motion of the elements of the gear unit. The turbine member of the hydrokinetic torque converter unit is coupled to either one or both of two torque input members of the gear unit. Another member of the gear unit is drivably connected to a driven shaft. Means are provided for braking either one of two reaction members of the gear unit during operation in a selected underdrive speed ratio. The brakes and clutches may be applied in pairs to establish low speed ratio operation, intermediate speed ratio operation, and direct drive high speed ratio operation.

The provision of an improved mechanism of the type above set forth being a principal object of our invention, it is another object of our invention to provide a control system for an automatic power transmission mechanism that is characterized by a high degree of smoothness during speed ratio changes.

It is another object of our invention to provide a simplified control system for an automatic power transmission mechanism in which over-lapping in the application and release of the paired speed ratio controllers is eliminated. This greatly simplifies the timing problems normally associated with speed ratio shifts in a multiple speed ratio power transmission mechanism of this type.

It is a further object of our invention to provide overrunning couplings for each of two reaction members of the gear unit, said couplings providing in part a torque reaction delivery path to the transmission casing. We contemplate further that so-called "pick-up" shifts may be accomplished by employing overrunning couplings during a transition from a low speed ratio to an intermediate speed ratio and also during a transition from the intermediate speed ratio to a direct drive ratio.

It is a further object of our invention to provide a control system for an automatic multiple speed ratio power transmission mechanism wherein fluid pressure operated servos of minimum fluid capicity are employed for applying the reaction brakes and the fluid pressure operated clutches.

It is a further object of our invention to provide a multiple speed ratio power transmission mechanism having a simplified control system that is relatively insensitive to changes in the temperature of the oil that is employed in the circuit of which the servos form a part.

It is a further object of our invention to provide a control system of the type above set forth wherein the need for providing adjustment of the servos after assembly is substantially eliminated.

It is another object of our invention to provide a control system for an automatic power transmission mechanism wherein provision is made for increasing the life of the friction materials used in the speed ratio controllers for the elements of the gear unit.

We contemplate that the improvements of this invention can be applied to each of two alternate transmission embodiments, one of which is disclosed in co-pending application Serial Number 241,726, filed December 3, 1962, now abandoned, which is assigned to the assignee of this instant invention. Reference may be had to this co-pending application for the purpose of supplementing the instant disclosure.

For the purpose of describing more particularly the improvements of our invention, reference will be made to the accompanying drawings, wherein:

FIGURE 4 is a chart showing the clutch and brake release pattern during an upshift and a downshift;

FIGURES 5a and 5b show in schematic form a control circuit diagram for a control system capable of being used with the structure of FIGURE 1;

FIGURE 6 is an enlarged view of the forward clutch servo for the mechanism of FIGURE 1;

FIGURE 7 is an enlarged view in schematic form of the rear clutch assembly of FIGURE 1;

FIGURE 8 is an enlarged view in schematic form of the intermediate coupling servo of FIGURE 1;

FIGURE 9 is an enlarged view showing the scheduling valve and controller valve of the schematic circuit drawing of FIGURE 5a; and FIGURES 10a and 10b show in cross sectional form another multiple speed power transmission mechanism capable of embodying the improvements of our invention.

Description of gear unit

Figure 1:
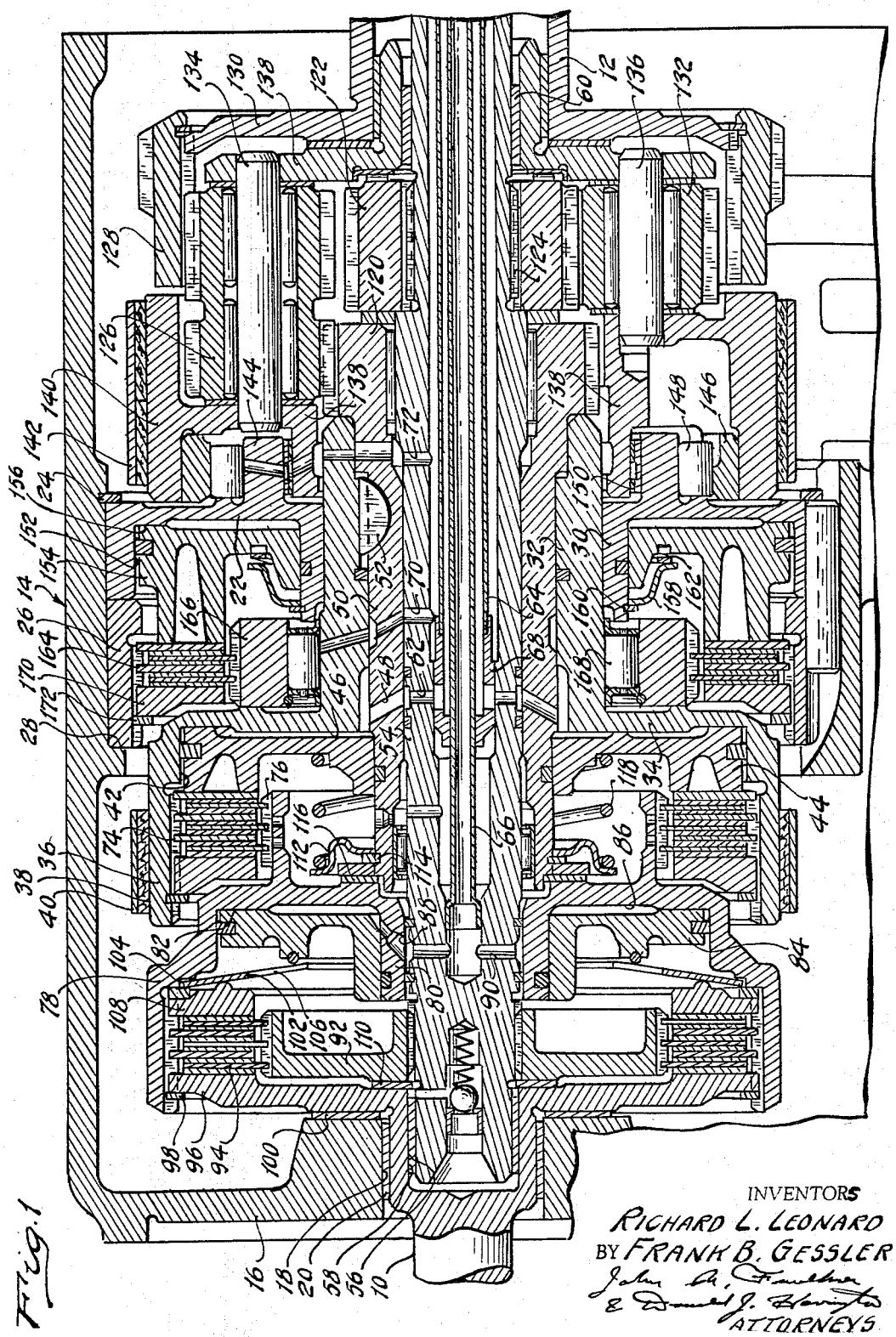
FIGURE 1 shows in cross sectional form a multiple speed ratio power transmission mechanism capable of embodying the improvements of our invention.

Referring first to FIGURE 1, numeral 10 designates a power input shaft which may be connected to a crank shaft for a throttle controlled, internal combustion engine. A power output shaft is designated generally by reference character 12. A transmission casing or housing is shown at 14 and includes a forward wall 16 that is formed with an opening 18 within which the shaft 10 is journaled. A suitable bushing 20 can be provided for this purpose.

An intermediate supporting wall 22 is situated in the intermediate region of the housing 14 and is supported by the housing about its periphery. Axial movement of the supporting wall 22 in one direction is inhibited by a snap ring 24. Axial movement in the opposite direction is inhibited by an internally splined clutch member 26 that in turn is seated against a shoulder 28 formed in the inner periphery of the housing 14.

Supporting wall 22 includes an axial extension 30 within which is journaled a sleeve shaft 32. This shaft 32 is connected to or formed integrally with a clutch member 34 in the form of a drum. The outer periphery 36 of clutch member 34 defines a friction brake surface 38 about which is positioned a friction brake band 40. This brake band 40 can be engaged and released by a suitable fluid pressure operated servo, not shown.

Clutch member 34 defines an annular cylinder 42 within which is positioned an annular piston 44. This piston 44 and the cylinder 42 cooperate to define a fluid pressure cavity designated by reference character 46.

Fluid pressure can be admitted to the cavity 46 through a radially directed passage 48 formed in a sun gear shaft 50 which may be keyed by means of the key 52 to the aforementioned sleeve shaft 32.

A second sun gear shaft 54 is positioned concentrically within shaft 50. It is journaled at the left hand end within a pilot recess 56 formed in the power input shaft 10. A suitable bushing 58 is provided for this purpose. Shaft 54 is journaled at the other end within a cooperating opening formed in a carrier sleeve disposed in the power output shaft 12, a suitable bushing 60 being provided for this purpose.

Passage 48 communicates with a branch passage 62 which in turn communicates with an annular pressure passage defined by concentric sleeves 64 and 66 disposed within a central longitudinal opening formed in the shaft 54. Sleeves 64 and 66 are supported by an adaptor 68 received within the opening in the shaft 54. The right hand end of the assembly of FIGURE 1 may be provided with a suitable manifold for distributing pressure selectively to the annular passages defined by the sleeves 64 and 66 and to the interior of sleeve 66.

The annular space surrounding the outer periphery of sleeve 64 serves as a lubricating oil passage, the lubricating oil being distributed radially through appropriate branch passages 70 and 72 to clutch and brake structure subsequently to be described.

The aforementioned clutch member 34 is splined internally to accommodate a driving connection with externally splined clutch discs of a multiple disc clutch assembly 74. Cooperating internally splined clutch discs of the assembly 74 are carried by an externally splined clutch disc member 76 which in turn is carried by the clutch drum 78. Drum 78 is supported by a hub 80 which is journaled upon shaft 54. It defines an annular cylinder 82 within which is positioned an annular piston 84. The piston 84 and the cylinder 82 define a pressure chamber 86 that communicates with a central passage formed by sleeve 66 by means of branch passages 88 and 90.

Another clutch member 92 is splined or otherwise positively connected to shaft 54. It is externally splined to facilitate a driving connection with internally splined discs of a multiple disc clutch assembly 94. Externally splined clutch discs of the assembly 94 are connected to an internally splined portion of the clutch drum 78.

A clutch reaction plate 96 is connected to the periphery of clutch member 78 and is held against axial movement by a snap ring 98. This member 96 is connected to power input shaft 10. Axial thrust forces acting upon the member 96 are distributed to the casing through a bushing 100 situated adjacent the forward wall 16 of the housing 14.

The pressure forces of the piston 84 are transferred to the multiple disc clutch assembly 94 through a force transmitting lever in the form of a Belleville spring 102. This spring 102 is anchored at 104 upon the clutch member 78. The piston 84 acts upon the radially inward peripheral portion 106 of the spring 102 as fluid pressure is admitted to the chamber 86. An intermediate portion of the spring 102 acts upon a thrust plate 108 which in turn compresses the discs of the multiple disc clutch assembly 94 to establish a driving connection between shaft 10 and clutch member 78.

As fluid pressure is released from the chamber 86, Belleville spring 102 returns the piston 84 to the retracted position shown in FIGURE 1, thus disengaging the multiple disc clutch assembly 94.

The thrust bearing 110 is disposed between member 96 and member 92. Sleeve shaft 50 carries a spring seat member 112 that is held fast against axial movement by a snap ring 114 secured to the shaft 50. Thrust forces are distributed from the shaft 50 to the clutch member 78 through thrust bearing 116.

The piston return spring 118 is disposed between piston 44 and the spring seat member 112 thus normally urging the piston 44 to a clutch release position. If pressure is admitted to the chamber 46, the discs of the multiple disc clutch assembly 74 are brought into frictional engagement, thus establishing a driving connection between shaft 10 and shafts 32 and 50.

A first sun gear is shown at 120 and a second sun gear is shown at 122. Sun gear 120 is connected to sleeve shaft 50 and sun gear 122 is connected to the shaft 54. A splined connection between gear 122 and shaft 54 is shown at 124.

Long planet pinions 126 are in driving engagement with sun gear 120 and with the ring gear 128. This gear 128 is supported by a radially situated drive member 130 carried by power output shaft 12.

Planet pinions 126 drivably engage also short planet pinions 132. Pinions 132 engage also sun gear 122.

Pinions 126 are supported by pinion shafts 134 and planet pinions 132 are supported by pinion shafts 136. Shafts 134 and 136 in turn are carried by a common carrier 138. By preference, the pinions 132 and 126 are supported upon their respective pinion shafts by needle bearings as indicated.

Carrier 138 defines also a brake drum 140 about which is positioned a friction brake band 142. This band, like the band 40, can be engaged and released by a suitable fluid pressure operated servo, shown in FIGURES 5A and 5B.

An inner race 144 for an overrunning brake mechanism is carried by supporting wall 22. An outer race 146 is connected to the interior of brake drum 140. Situated between the races 144 and 146 is a series of rollers 148 which cooperate with cam services on the outer race 146 to inhibit rotation of the carrier 138 in one direction while allowing rotation thereof in the opposite direction. Carrier 138 is supported within the interior of race 146 by a suitable bushing 150 as indicated.

Supporting wall 22 defines an annular cylinder 152 within which is positioned an annular piston 154. This piston 154 and cylinder 152 define a pressure chamber 156 which may be supplied with pressurized fluid through a suitable porting. An anchor member 158 is fixed by means of a snap ring 160 upon the extension 30 of the supporting wall 22. A suitable piston return spring 162 can be provided between member 158 and piston 154 to urge normally the piston 154 in a right hand direction as viewed in FIGURE 1.

Externally splined discs of a multiple disc brake assembly 164 are carried by an internally splined portion of the member 26. Internally splined discs of the assembly 164 are splined to externally splined outer race member 166 for an overrunning brake assembly. This assembly includes a series of rollers 168 situated between the race 166 and the outer periphery of sleeve shaft 32, the race 166 being cammed to establish braking action for the rollers 168 thus inhibiting rotation of the shaft 32 in one direction while permitting free rotation thereof in the opposite direction during operation of the mechanism with the multiple disc brake assembly 164 engaged.

Engagement of the multiple disc brake assembly 164 can be accomplished by supplying pressure to the chamber 156. The reaction force of piston 154 is taken by a reaction disc 170 secured by a snap ring 172 against axial displacement.

The previously mentioned lubricating oil passages 70 and 72 communicate through porting, as indicated, with the overrunning brake assembly shown in part at 168 and the overrunning brake assembly shown in part at 148.

To establish first gear ratio operation, multiple disc clutch assembly 94 is applied. The torque of shaft 10 then is distributed to sun gear 122 with the carrier 138 acting as a reaction member. The ring gear 128 and the power output shaft 12 then are driven in a forward driving direction at a reduced speed ratio. Carrier reaction is obtained by reason of the braking action of the overrunning brake assembly shown in part at 148. If brake band 142 is applied, the braking action of the brake assembly shown in part at 148 is supplemented and free-wheeling motion of the carrier in either direction is prevented.

To establish intermediate speed ratio operation, the multiple disc brake assembly 164 is applied through the medium of the overrunning brake assembly shown in part at 168. Sun gear 120 thus becomes anchored and functions as a reaction member for the planetary gear unit. The overrunning brake assembly shown in part at 148 will overrun. Power output shaft 12 thus will be driven at an intermediate speed ratio. Thus the shift from the lower speed ratio to the intermediate speed ratio is accomplished merely by engaging a single disc brake assembly, and timed engagement and release of friction torque establishing devices is not required. This type of shift is commonly referred to as a "pick-up" shift.

Following application of the multiple disc brake assembly 164, brake band 40 is applied. This will permit coast braking during intermediate speed ratio operation. Brake band 40 will supplement the braking action of multiple disc brake assembly 164 and inhibit rotation of the sun gear 120 in either direction. To initiate a normal upshift, however, it is not necessary to employ brake 40. It is applied after a 1-2 shift but before a subsequent 2-3 shift.

During operation in the low speed ratio and the intermediate speed ratio, the multiple disc clutch assembly 94 continues to be applied. It is applied also during operation in the direct drive ratio. Such direct drive ratio is obtained by engaging multiple disc clutch assembly 74 following release of brake band 40 so that assemblies 74 and 94 are engaged simultaneously. This establishes an effective driving connection between the sun gears 120 and 122, thus causing the planetary gear assembly to rotate with a one-to-one speed ratio. The shift from the intermediate speed ratio to the direct drive ratio also can be characterized as a "pick-up" shift. After the shift is completed, the overrunning brake assembly shown in part at 168 free wheels.

To establish reverse drive operation, it merely is necessary to disengage multiple disc clutch assembly 94 and engage multiple disc clutch assembly 74. Brake band 142 is applied to anchor the carrier 138. The torque of shaft 10 is distributed directly to sun gear 120, and since carrier 138 functions as a reaction member, ring gear 128 and power output shaft 12 are driven in a reverse direction at a reduced speed ratio.

Following an up-shift from the intermediate speed ratio to the direct drive ratio, multiple disc brake assembly 164 remains applied thus making the transmission assembly ready for a subsequent high to intermediate downshift. If such a downshift is desired, it merely is necessary to disengage multiple disc clutch assembly 174. After the multiple disc clutch assembly 174 is relieved of the torque, the overrunning brake assembly shown in part at 168 again will be capable of distributing reaction torque from sun gear 120 through the engaged multiple disc brake assembly 164 to the housing after the sun gear 120 decelerates to zero angular velocity. Again, no shift timing is involved and the ratio transition is smooth.

Under certain operating conditions it is desired to obtain a so-called manual low and inhibit automatic up-shifts. Under these conditions, the brake 142 can be applied continuously thereby accommodating the reaction torque of the carrier 138 in either direction. If the driver desires to condition the mechanism for continuous operation in the intermediate speed ratio, brake 40 and the assembly 164 can provide the necessary torque reaction in either direction for the sun gear 120.

By employing the mechanism herein described, smoothness is accomplished in part by reason of the elimination of the overlap timing problems normally associated with conventional automatic transmissions. The low to intermediate, and the intermediate to high up-shifts are similar to so-called clutch-to-clutch shifts which are inherently smoother than shifts that require timed application or release of friction band brakes. The brake band 40 does not influence either up-shift since it has no function except in special applications when coasting operation is required.

In conventional automatic transmission mechanisms the up-shifts from low to intermediate and from intermediate to high under zero or minimum engine throttle conditions normally are associated with an undesirable harshness. This condition is eliminated in our improved arrangement because of the quickness with which a shift may be accomplished. This is due in part to the fact that only one clutch must be supplied with control oil as distinguished from two separate servo mechanisms in transmission mechanisms of known design. It is necessary in such conventional mechanisms to distribute control oil to the release side of a double-acting brake control servo simultaneously with the distribution of oil to a high speed clutch servo. Thus the servo oil volume requirement of our arrangement is substantially less than the corresponding oil volume requirement of conventional transmissions.

In a down-shift from the high speed ratio to the intermediate speed ratio and from the intermediate speed ratio to the low speed ratio, it merely is necessary to release a multiple friction disc assembly as the reaction member for that particular ratio is decelerated. It then is stopped completely by one or the other of the overrunning brake assemblies.

The temperature of the oil used for control purposes has no influence whatsoever upon the timing of the up-shift. Neither does it influence the so-called shift feel. This is also due in part to the fact that timing and overlap problems are eliminated.

Unlike conventional power transmission mechanisms, no brake band adjustment is required. Also the friction members have substantially longer life due to the fact that continued slipping is not required of one friction device until another friction device is disengaged under torque delivery conditions.

If a coasting high to intermediate down-shift is required, it merely is necessary to engage brake 40. This also can be made with a minimum degree of harshness due to the fact that the servo size required to operate brake band 40 is substantially reduced relative to the corresponding servo size of conventional mechanisms. This servo does not take reaction torque during normal torque delivery up-shifts since the overrunning brake assembly shown in part at 168 performs this function.

Figures 2, 3:
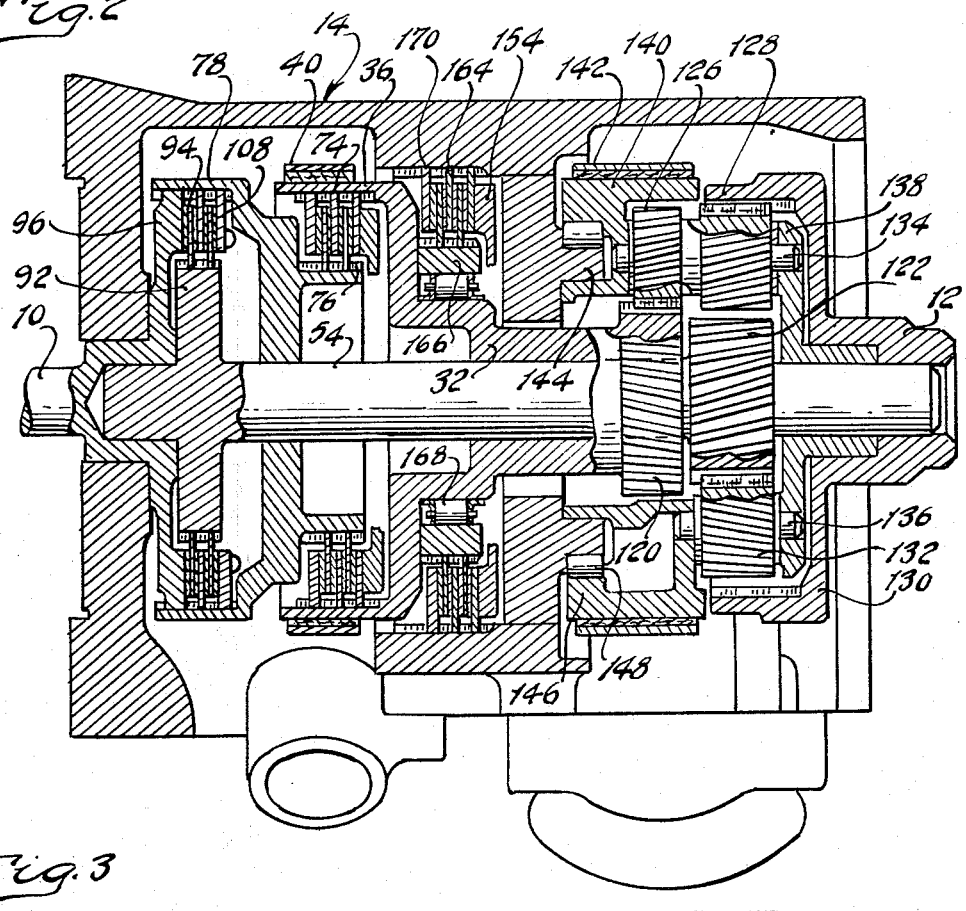
FIGURE 2 is a schematic representation of the structure of FIGURE 1.
FIGURE 3 is a chart showing the clutch and brake engagement and release pattern that is necessary to establish speed ratio changes in the mechanism of FIGURE 1.

FIGURE 2 shows a schematic representation of the structure of FIGURE 1, and corresponding reference characters have been applied.

FIGURE 3 is a chart illustrating the shift pattern described in the foregoing paragraphs. It shows the sequence of clutch and brake application.

*Description of control circuit of FIGURES 5a through FIGURE 9*

The members of the gear unit of FIGURE 1 are controlled by five servos that are identified in FIGURES 5a and 5b by the symbols "front clutch," "rear clutch," "intermediate coupling servo," "front servo" and "rear servo." The front clutch functions to deliver torque to the primary sun gear 122 when it is engaged. If we assume that the structure of FIGURE 1 is viewed from the left hand side of FIGURE 1, the primary sun gear will be driven in a clockwise direction.

The intermediate coupling servo allows the secondary sun gear 120 to free wheel in a counterclockwise direction and is disengaged during operation in low. It is engaged, however, as previously explained, during operation in intermediate. Thus, when it is released, the sun gear 120 may move in a counterclockwise direction, as viewed from the left side of FIGURE 1, but it grounds the overrunning coupling shown in part at 168 when it is applied. This overrunning coupling prevents counterclockwise rotation of the sun gear 120 during operation in the intermediate speed ratio, but it permits clockwise rotation.

The overrunning coupling shown in part at 148 anchors the planet carrier against counterclockwise rotation during operation in the first speed ratio, but permits clockwise rotation upon a subsequent upshift.

The front servo applies the front band only to prevent the sun gear 120 from rotating in a clockwise direction during operation in the intermediate speed ratio under coasting conditions. As previously explained, it is applied with a delayed action following application of the intermediate coupling servo.

The reverse brake servo is applied to prevent clockwise rotation of the planet carrier during reverse only. It is applied also, of course, during operation in manual low, as previously explained.

The rear clutch, together with the front clutch, causes clockwise rotation of the sun gear 120 and locks the same to the other sun gear 122 during operation in the high speed ratio. Both sun gears then rotate in a clockwise direction.

Upon a 3–2 downshift the rear clutch is released and the intermediate one-way coupling takes over the torque reaction function to anchor the sun gear 120. This can be described as a clutch to overrunning coupling downshift. During a 2–1 downshift, the intermediate coupling servo is released and the overrunning coupling shown in part at 148 assumes a torque reaction function. Like the 3–2 downshift, this downshift is a friction coupling to an overrunning coupling downshift.

During coasting in the first speed ratio, all reaction members are released, and a free-wheeling condition results.

Referring particularly to FIGURES 5a through 9, it will be apparent that the principal valve components have been identified by suitable reference legends. Shown also in FIGURE 5a is a torque converter unit that may be used for delivering multiplied engine torque to the power input shaft 10 of the structure of FIGURE 1. This unit comprises an impeller shell 180 which may be connected drivably to the crankshaft of an internal combustion vehicle engine (not shown). The shell comprises two parts 182 and 184 which are secured together by a suitable peripheral weld to form an integral assembly.

Disposed within shell part 182 is an outer impeller shroud 186 and an inner impeller shroud 188. Shroud 186 is secured at its outer periphery to the interior of shell part 182 and is secured at its inner periphery to a radially inward hub portion of shell 182.

Impeller blades 190 are disposed between the shrouds 186 and 188 and are held in place at their margins by tabs which engage cooperating openings in the shrouds 186 and 188.

Disposed in toroidal fluid flow relationship with respect to the fluid flow passages defined by the impeller blades 190 is a turbine that includes an outer shroud 192 and an inner shroud 194. Situated between the shrouds 192 and 194 is a series of turbine blades 196. The margins of the blades 196 are secured to shrouds 192 and 194 by suitable tabs that are received through cooperating openings in the shrouds.

The radially inward portion of the shroud 192 is secured to a turbine hub member 198. This hub member in turn is drivably connected through a suitable shaft to the power input shaft 10 of the structure of FIGURE 1.

A stator is situated between the fluid flow exit section of the turbine and the entrance section of the impeller. The stator comprises stator blades 200 located at a radially inward region of the torus circuit of the torque converter unit. These blades 200 are situated between a first shroud 202 and a second shroud 204. Shroud 204 is defined by a stator hub within which is disposed an outer overrunning coupling race 206 and an inner race 208, the latter being connected to a relatively stationary sleeve shaft that in turn may be bolted or otherwise secured to the transmission housing.

Overrunning brake elements 210 in the form of sprags or rollers are situated between the races 206 and 208. If rollers are employed, one of the races 206 or 208 must be cammed to accommodate the rollers. Stator 200 thus is inhibited from rotation in a direction opposite to the direction of rotation of the turbine, but it is capable of free-wheeling in the direction of rotation of the turbine.

Secured to the hub of impeller shell part 182 is a supporting sleeve shaft 212 which may be journaled suitably within a bearing portion of the transmission assembly. Drivably connected to shaft 212 is a drive gear 214 of a front pump identified generally by reference character 216. Pump element 214 engages a cooperating pump element 218 and is adapted to supply control pressure to a line pressure passage 220. The input side of the pump 216 communicates with a pump supply passage 222 which in turn communicates with an oil screen or filter 224 located within a transmission sump defined by the lower portion of the transmission housing.

Passage 220 communicates with a main oil pressure regulator valve that comprises a valve chamber 226 within which is situated a multiple land valve spool 228. A converter feed passage 230 communicates with the valve chamber 226 at a point adjacent the passage 220. Valve spool 228 is biased in a downward direction by a valve spring 232 thus tending normally to close passage 220.

Passage 220 communicates through a one-way check valve 234 with a control pressure passage 236. This passage 236 in turn communicates with a differential area defined by valve lands 238 and 240 located on the valve spool 228. The pressure force thus acting upon this differential area opposes the spring force of spring 232.

Valve land 242 establishes controlled communication between the passage 236 and a low oil pressure regulator passage 244 which communicates with a low oil pressure regulator valve. Valve land 242 uncovers a port that communicates with passage 236 following movement of valve land 228 across passage 220. Thus pressure is made available to passage 230. Pressure is made available immediately also to the rear lube circuit through passage 246 which communicates with the low oil pressure regulator valve.

Oil circulates through the converter and returns through passage 248 which communicates with the lower end of a low oil pressure regulator valve chamber 250. Under initial starting conditions, valve land 252 blocks communication between passage 248 and the passage 254 which extends to an oil cooler 256. Pressure is made available, however, to passage 246 and priority then is given to the lubrication requirements of the transmission mechanism.

The low oil pressure regulator valve comprises a valve spool that includes also a valve land 258. This valve spool is biased in a downward direction by a valve spring 261.

Upon an increase in the pressure made available by the front pump, the pressure acting upon the differential area defined by lands 252 and 258 will urge the low oil pressure regulator valve in an upward direction until valve land 258 uncovers passage 260 which communicates with the supply passage 222 for the front pump. The low oil pressure regulator valve thereafter will regulate the pressure for the converter and the lubricating oil system in the usual fashion.

The main oil pressure regulator valve will assume a regulating condition as soon as land 228 uncovers passage 220. As check valve 234 opens, control pressure is made available to the main control pressure passage 262. Passage 262 also is connected to the high pressure discharge port for a power output shaft driven pump identified in FIGURE 5b as a rear pump. A communicating passage is indicated by reference character 264.

The intake side of the rear pump communicates with the oil sump through an intake passage 266, and the discharge port for the rear pump communicates with passage 264 through a one-way check valve 268. Under those conditions in which the pressure in passage 220 is greater than the pressure on the discharge side of the rear pump, check valve 268 will be closed and check valve 234 will be open. Under certain driving conditions, however, it is possible for the rear pump to develop sufficient pressure to cause valve 260 to open and to cause valve 234 to close. Under these conditions the rear pump functions as a fluid pressure source for the control circuit.

The main oil pressure regulator valve will maintain a controlled operating control pressure in passage 236. The magnitude of that pressure is dependent upon the calibration of the spring 232 and upon the magnitude of a compensator pressure that acts upon the lower end of the main oil pressure regulator valve spool. This compensator pressure and its source will be described subsequently.

The fluid in passage 244 that is received from the main oil pressure regulator valve is regulated in turn by the low oil pressure regulator valve when the latter assumes the position shown in FIGURE 5a. At this time communication is established by land 252 between passage 248 and passage 254. Controlled communication is established also between passage 246 and return passage 260. The low oil pressure regulator valve maintains a pressure that is dependent upon the calibration of spring 261 and upon the magnitude of compensator pressure at the lower end of the low oil pressure regulator valve chamber 250. As previously mentioned, the compensator pressure and the compensator pressure source will be described subsequently.

The regulating control pressure that is distributed to passage 262 communicates with a manual valve that comprises a manual valve chamber 270 within which is situated a manual valve spool 272 having multiple lands 274, 276 and 278. The manual valve spool can be adjusted to any of several operating positions that are indicated by the symbols P, R, N, D2, D1 and L in FIGURE 5a. These positions correspond respectively to the park position, the reverse position, neutral position, the second drive range position, first drive range position and a manual low drive range position. If the manual valve assumes the L position upon starting from a standing start, the transmission will operate continuously in the low speed ratio range and will not upshift. If it assumes a D1 position, the vehicle will accelerate from a standing start and automatic shifts will take place between low and second and between second and high as the vehicle accelerates. If the manual valve moves to the D2 position, the vehicle will accelerate from a standing start in the second drive range and then upshift into high. The first speed ratio is eliminated.

When the manual valve spool assumes the N position, all the clutch and brake servos are exhausted and the transmission is incapable of torque delivery.

Upon movement of the manual valve spool to the reverse R position, the transmission will be conditioned for reverse drive operation only.

A park mechanism (not shown) is actuated by means of a mechanical connection between the manual valve operator linkage and a positive brake associated with the power output shaft.

If we assume for purposes of this description that the manual valve is moved to the D1 position, passage 262 will be uncovered by valve land 276. Passage 262 is blocked, however, when the manual valve assumes the neutral position.

During operation in the D1 range, control pressure then will pass from passage 262 through the manual valve chamber 270 to passage 280 which communicates with the lower end of a rear servo lock-out valve which comprises a valve chamber 282 and a shiftable valve element 284. A valve spring 286 urges valve element 284 in a down position, but element 284 is urged upwardly as passage 280 becomes pressurized. When valve element 284 moves upwardly against the opposing force of spring 286, an exhaust port 288 is uncovered by valve land 290 and is brought into communication with a passage 292 which communicates with a pressure apply chamber in the rear servo. This servo may comprise a cylinder 294 within which is positioned a brake operating piston 296. This piston normally is urged to a brake release position by a servo spring 298. It cooperates with a cylinder 294 to provide a pressure chamber with which the passage 292 communicates.

Disposed within the piston 296 is a small, fast-acting, slack take-up piston 300 which communicates with a servo pressure chamber through an opening within which is disposed a one-way check valve 302. When the piston assumes a fully released position, check valve 302 is opened as it engages the end of cylinder 294. This establishes communication between the auxiliary chamber behind slack take-up piston 300 and the main pressure chamber. Piston 300 is connected mechanically to a brake operating lever 304.

Upon application of pressure to the brake servo pressure chamber, piston 300 will move in advance of movement of the main piston 296. A fluid trap then will be created as the main piston 296 begins to move following a continued pressure build-up in the servo pressure chamber. The main piston 296 will move telescopically with respect to the piston 300 as fluid is transferred from the region behind the piston 300 to the main pressure chamber through a bleed passage 306. As the piston 300 bottoms against the main piston 296, the servo brake will become fully energized.

The manual valve will allow pressure to be distributed also from passage 262 to a passage 308 which communicates directly with the front clutch to apply the same. This clutch comprises a pressure chamber that is defined by cylinder 82 and cooperating piston 84. Passage 308 communicates with this chamber as previously described.

Passage 308 distributes control pressure also to a passage 310 which communicates with a power output shaft driven governor 312. This governor comprises a multiple land, bipartite valve spool having lands 314, 316, 318 and 320. The valve spool is situated within a valve chamber 322 which communicates at its upper end with an exhaust region.

A governor pressure delivery passage 324 communicates with the valve chamber 322 and the degree of communication is controlled by valve land 320. As the latter moves radially outwardly, the degree of communication between chamber 322 and passage 324 is increased. Upon such radially outward movement, however, the degree of communication between the passage 324 and the exhaust region is decreased.

The pressure made available by passage 310 acts upon a differential area defined by lands 316 and 314. A cross over passage 326 is provided for establishing the necessary communication between the radially spaced cooperating valve lands of the valve chamber 322.

As the speed of rotation of the power output or tailshaft increases, the pressure in passage 324 will increase by reason of the modulating action of the governor 312. This pressure, hereinafter referred to as governor pressure, is distributed through passage 324 to the 1–2 shift valve and the 2–3 shift valve as well as to the compensator valve, each of which will be described subsequently.

Pressure in passage 308 is distributed also to the upper end of a transition valve through a passage 326. This transition valve comprises a valve chamber 328 within which is situated a valve element having spaced valve lands 330, 332 and 334. The diameter of valve land 330 is substantially greater than the diameter of valve lands 332 and 334. Thus if the lower end of the valve chamber 328 is pressurized with line pressure, the transition valve element will assume an upward position which causes valve land 334 to interrupt communication between passage 326 and a passage 336, the latter communicating with the pressure chamber for the intermediate coupling servo that is defined by the previously described piston 22 and the cooperating chamber 156. The upper end of the valve land 334 is loaded hydraulically, however, with the line pressure that exists in passage 326. Thus if the transition valve element assumes a downward position, the intermediate coupling servo will become applied. If it assumes an upward position, however, the intermediate coupling servo is exhausted through passage 336 and through an exhaust port 338 that is brought into communication with passage 336 by the valve land 334 as it assumes an upward position.

The distribution of pressure to the lower end of the valve chamber 328 is accomplished in part by passage 340 which communicates with the 1–2 shift valve. This valve comprises a valve chamber 342 within which is positioned a shift valve element having three spaced valve lands 344, 346 and 348. The 1–2 shift valve element is urged in an upward direction by a valve spring 350. When the shift valve element assumes the position shown in FIGURE 5b, communication is established by valve lands 346 and 344 between passage 340 and a passage 352 which in turn communicates with the control pressure passage 262 through the manual valve. If we continue to assume that the manual valve assumes a D1 position, valve land 276 then will block communication between passage 352 and adjacent passage 354 which extends from the manual valve chamber to a downshift valve subsequently to be described. Under these conditions, passage 354 is exhausted through exhaust port 356 in the manual valve chamber. Another passage 358, which also communicates with the manual valve chamber at a point between exhaust port 356 and passage 354, also is exhausted through a passage 356 when the manual valve element assumes the D1 position.

Referring again to the 1–2 shift valve, it is apparent that governor pressure in passage 324 is caused to act upon the upper end of the land 344 thus tending to urge the shift valve element downwardly against the opposing force of spring 350. Under initial starting conditions the governor pressure is insufficient to overcome the opposing spring force and communication is established between passages 340 and 352, as previously explained. After a predetermined vehicle speed is obtained, however, the 1–2 shift valve element will move in a downward direction thus causing land 344 to block passage 352 and establish communication between passage 340 and exhaust port 360.

Throttle pressure, which is obtained from a source subsequently to be described, acts upon a differential area defined by the valve lands 346 and 348. This throttle pressure, which is an indicator of engine torque demand, is distributed to the 1–2 shift valve chamber through a passage 362. The force established by this pressure supplements the force of the spring 350 and the shift point then is determined in part by the torque demand. Upon movement of the 1–2 shift valve to a downward position, however, passage 362 is blocked by land 346 and the differential area that previously was pressurized by the torque demand sensitive throttle pressure is exhausted through passage 365 which communicates also with the 1–2 shift valve chamber. This passage 365 communicates with the passage 366 which in turn communicates with the previously described passage 354 through the downshift valve subsequently to be described. A hysteresis feature then is introduced in the action of the 1–2 shift valve. Thus the 1–2 shift valve element will assume an upward position following the movement in a downward direction at a speed which is less than the speed that caused the downward movement of the 1–2 shift valve element in the first instance.

The areas of the 1–2 shift valve lands and the valve spring can be calibrated to establish the proper shift point.

As the vehicle accelerates from a standing start while the manual valve is in the D1 position, passage 340 will be pressurized. Under these conditions the transition valve element will assume an upward position and passage 336 and the intermediate coupling servo will be exhausted. Furthermore, since the rear servo lock-out valve has assumed an upward position, as previously explained, the lower valve land shown at 364 will block communication between passage 340 and passage 292 which extends to the rear servo. This same valve land 364 also blocks communication between passage 340 and a passage 368 which extends to the lower end of the 1–2 shift valve chamber 342. The transmission then is conditioned for first speed operation since the front clutch is applied and the overrunning coupling shown in part at 148 is capable of accommodating the driving torque reaction of the planetary gear carrier.

After the vehicle accelerates to a predetermined speed for any given engine torque demand, the 1–2 shift valve will move in a downward direction in the manner previously described. This will cause passage 340 to become exhausted through port 360. Since control pressure in passage 326 acts upon the upper end of the transition valve chamber, the transition valve element will assume the position shown in FIGURE 5b. Pressure then will be distributed directly to the intermediate coupling servo to apply the same.

To control the rate of application of the intermediate coupling servo and to provide the necessary delay in the application of the front servo, the controller valve, the scheduling valve and the shuttle valve are introduced into the circuit. These valves now will be described.

The shuttle valve comprises a valve chamber 370 within which is situated a shuttle valve element having spaced valve lands 372, 374 and 376. The shuttle valve element normally is urged in an upward direction by a shuttle valve spring 378. During operation in the first speed ratio, front clutch pressure is distributed to the upper end of the shuttle valve chamber through a branch passage 380. A flow restricting orifice is situated in this passage 380 as indicated. Since passage 336 is exhausted during operation in the first speed ratio, the pressure acting upon the shuttle valve element at the lower end of the shuttle valve chamber is zero. Under these conditions the shuttle valve element assumes a downward position against the opposing force of spring 378. Thus communication between passage 380 and a companion passage 382 is interrupted. Passage 382, however, is exhauted through a cooperating exhaust port 384 situated in the shuttle valve chamber adjacent the location at which passage 382 communicates with the shuttle valve chamber 370. Furthermore, when the shuttle valve element assumes a downward position, valve land 374 blocks passage 386 which extends to the rear clutch, thereby interrupting communication between passage 386 and the passage 388 extending through the scheduling valve and the controller valve. Passage 388, however, is brought into communication with the lower end of the shuttle valve chamber and passage 336 through cross-over passage 390.

Immediately upon movement of the transition valve in a downward direction following shifting movement of the 1-2 shift valve, passage 336 becomes pressurized thereby causing a pressure build-up to occur at the lower end of the shuttle valve chamber. When the magnitude of this pressure build-up reaches a value that is substantial but less than the maximum control pressure available for the prevailing engine torque demand, the shuttle valve element will move in an upward direction. This then will establish immediately communication between passage 380 and passage 382 and at the same time interrupt communication between passage 382 and the exhaust port 384. Passage 382 communicates with a passage 392 which extends to the front servo. This communication is established by the 2-3 shift valve. Thus the front servo becomes applied only after a substantial pressure build-up has occurred in the intermediate coupling servo. This introduces a delaying action which assures that the front servo will be applied only after the intermediate coupling servo is capable of accommodating the reaction torque.

The torque demand sensitive throttle pressure in passage 442 is obtained by means of a throttle boost valve and a vacuum throttle valve. For a particular description of these valves, reference may be made to the co-pending application of James J. Duffy, Serial Number 6,703, now Patent No. 3,095,755, which is assigned to the assignee of this invention. Reference may be made to the Duffy disclosure for the purposes of supplementing this disclosure.

The throttle boost valve comprises a boost valve chamber 450 within which is situated a valve spool having valve lands 452 and 454. Control pressure is distributed to the throttle boost valve chamber through a branch passage 456 which communicates with the main control pressure passage 262. Communicating also with valve chamber 450 is pressure signal passage 458 which communicates with a vacuum throttle valve having a valve chamber 460. A valve element 462 is situated within valve chamber 460. It is mechanically connected to a diaphragm assembly that comprises a part of an engine manifold pressure operated servo. A portion of the mechanical connection between the diaphragm assembly and the valve element 462 is shown at 464.

Upon an increase of engine manifold pressure the force acting upon valve element 462 in a right hand direction is increased. Conversely, as engine manifold pressure decreases, the forces acting in a right hand direction upon valve element 462 are decreased.

Control pressure is distributed to the valve chamber 460 through a branch passage 466 that, in turn, communicates with the previously described main control pressure passage 262. An exhaust port 468 communicates also with the chamber 460.

Valve element 462 establishes a controlled degree of communication between passage 466 and passage 458 whereby the magnitude of the pressure made available to passage 458 is an indicator of engine manifold vacuum. The pressure in passage 458 is distributed to the right hand end of the valve chamber 460 and urges the valve element 462 in a left hand direction. A modulating action then is established and the output signal in passage 458 is distributed to the throttle boost valve chamber 450. When the boost valve assumes the position shown, free communication is established between passage 458 and throttle pressure passage 442. This communication is made possible by reason of the annular space between valve lands 452 and 454. The pressure in passage 442 acts upon a valve plug 470. A boost valve spring 472 is situated between a stationary insert in the boost valve chamber and the boost valve element itself tends to urge the latter in a right hand direction. The size of the plug 470 and the calibration of the spring 472 can be chosen to provide a desired shift point.

The signal that is made available to passage 458 is an approximate indicator of engine torque at advance throttle settings. It is not a true indicator of engine torque demand, however, and for this reason it is necessary to augment or supplement the pressure signal in passage 458 before it is made available to the shift valves to establish the shift points. For this reason, the throttle boost valve is provided in the circuit. At advanced values for the pressure in passage 458, the throttle boost valve will be urged in a left hand direction against the opposing spring force. Cross-over passage 474 is provided for distributing the pressure signal in passage 458 to the right hand end of the boost valve element. At advanced engine throttle settings, a controlled degree of communication is established between line pressure passage 456 and the branch passage 476 communicating with the passage 442. At the same time the degree of communication between the passage 458 and passage 442 decreases. Thus the effective output pressure made available to passage 442 continues to increase in magnitude in response to changing engine throttle position notwithstanding the fact that such changes in the position of the engine throttle will not result in a proportional increase in torque.

A mechanical connection can be provided between the engine throttle valve and a downshift valve. The latter includes a valve chamber 478 within which is situated a downshift valve element having lands 480 and 482. These lands normally establish communication between passages 366 and 354, as indicated previously. If the engine throttle valve is moved to a wide open position, however, land 480 blocks passage 354 and land 482 uncovers a branch passage 484 communicating with the main control pressure passage 262. Communication then is established between the passage 282 and passage 366. This same pressure is distributed through port 486 in the 2-3 shift valve spool insert and to passage 362 which extends to the 1-2 shift valve chamber. The 2-3 shift valve then will assume immediately a downshift position for rapid acceleration purposes. If the vehicle speed is sufficiently low, the 1-2 shift valve similarly will be urged to a downshift position. A 2-1 downshift will not occur, however, at an undesirably high vehicle speed since the differential area defined by the valve lands 346 and 348 on the 1-2 shift valve spool is designed so that it will not overcome the governor pressure force at a vehicle speed that is above a desired value.

A downshift valve spring 488 normally urges the downshift valve element in a left hand direction, as indicated in FIGURE 5a.

The regulated line pressure made available to the circuit responds to changes in engine torque. This is accomplished by the action of the compensator valve which comprises a valve chamber 490 within which is situated a compensator valve element having spaced valve lands 492, 494, 496 and 498. A governor plug 500 is disposed in the left hand end of the compensator valve chamber. Governor pressure is distributed to the left hand end of this valve plug through governor pressure passage 502 which communicates with the previously described governor pressure passage 324. A valve spring 504 is disposed between plug 500 and the compensator valve element.

During the time interval in which the shuttle valve element is in a downward direction following shifting movement of the 1–2 shift valve, the pressure in passage 336 is distributed to passage 388, as mentioned previously. This pressure is distributed also to a scheduling valve chamber 394 within which is positioned a scheduling valve element 396. This valve element is urged in a downward direction, as viewed in FIGURES 5a and 9, by a valve spring 398. When it assumes this downward position, the exhaust port, shown at 400, is closed.

The lower end of the scheduling valve chamber 394 communicates also with a branch passage 402 that extends to the upper end of the scheduling valve chamber 394. Communication between the lower end of scheduling valve chamber 394 and passage 402 is restricted, however, by an orifice 404. The pressure that is introduced into passage 402 acts upon the valve element 396 and supplements the action of the spring 398.

This same pressure communicates through passage 406 with the right hand end of the controller valve chamber 408 within which is positioned a controller valve element 410. This valve element 410 is urged normally in a right hand direction by controller valve spring 412. The left hand end of the controller valve chamber 408 is exhausted through an exhaust port 414.

Following shifting movement of the transition valve in a downward direction, pressure will build up in passage 336 and in communicating passage 388 until the spring 398 begins to yield. By reference the spring rate is chosen so that it will allow a pressure build-up to occur in the intermediate coupling servo that is sufficient to initiate movement of the intermediate coupling servo piston 22 against its opposing spring force. When this occurs, the valve land of element 396 uncovers exhaust port 400, thereby retarding the rate of pressure build-up in passage 388 and in communicating passage 336. But pressure build-up will continue to occur, although at a reduced rate since the fluid that normally would be made available to the intermediate coupling servo is exhausted through the port 400.

The pressure build-up in passage 388 causes a corresponding pressure build-up on the upper end of the valve element 396. This, of course, changes the effective regulating characteristics of the valve element 396 since the resulting pressure force augments the spring force of the spring 398. The pressure build-up in the region of spring 398 is applied also to the right hand end of controller valve element 410. During the pressure build-up period, the spring 412 will yield. The pressure that is made available to the upper end of the scheduling valve element 396 increases as the spring 412 yields. The pressure build-up continues in this fashion until the controller valve element 410 has stroked fully. At this time, however, the pressure build-up in passage 336 will have reached a value that is only slightly less than the maximum value that is available for the prevailing engine torque demand. Thus the intermediate coupling servo will be applied fully and will be capable of accommodating the reaction torque for the gear unit. The shuttle valve is calibrated to move when this condition is reached. It moves, as previously explained, in an upward direction to establish communication between passages 380 and 382 that in turn results in the application on the front servo. At the same time, however, passage 388 becomes exhausted through passage 386. Thus the scheduling valve and the controller valve will assume their original conditions and have no further influence upon the intermediate coupling servo.

The scheduling valve and the controller valve function in the manner previously described to provide an accumulator effect, but this effect is achieved without the need for providing a large accumulator and without the need for pumping a large volume of oil. It is capable of establishing this accumulating action during the pressure build-up period for the intermediate coupling servo. Once the accumulating action has been terminated—for example, after the controller valve element has bottomed out—the intermediate coupling servo pressure will assume immediately a maximum value since the need for accumulation no longer exists. It is at this time that the scheduling valve shifts to the position shown.

We contemplate also that other variables may be used for influencing the action of the scheduling valve and the controller valve. It would be possible, for example, to apply control pressure or torque demand sensitive throttle pressure to appropriate control areas on the controller valve element to supplement the influence of the spring 412. The rate of pressure build-up for the intermediate coupling servo then could be tailored to reflect changes in other variables such as engine torque demand.

The transmission mechanism now is conditioned for intermediate speed ratio operation. It is capable also of accommodating coasting torque reaction by reason of the fact that the front servo is applied. This condition continues until the vehicle speed is sufficiently high to initiate a shift from the intermediate speed ratio to the high speed ratio.

This shift is controlled by a 2–3 shift valve which comprises a valve chamber 416 within which is situated a valve element having spaced valve lands 418, 420, 422 and 424. In the position shown in FIGURE 5b, the 2–3 shift valve is in the downshift position. Valve lands 418 and 420 then establish communication between passages 382 and passage 392, as previously mentioned. At the same time valve land 420 blocks an exhaust port 426. Passage 386, which was described with reference to the shuttle valve, communicates with a passage 428 that extends to the servo for the rear clutch. Passage 428 communicates with a passage 358 through the annular space between valve lands 420 and 422. Passage 358, as previously mentioned, is exhausted through exhaust port 356 in the manual valve.

Line pressure is distributed through the 2–3 shift valve and through a passage 430 which communicates with the previously mentioned passage 280. This passage 430 is blocked, however, by valve land 422 when the 2–3 shift valve assumes the position shown in FIGURE 5b.

Valve lands 422 and 424 define a differential area that is in communication with the previously described governor pressure passage 324. The governor pressure establishes a 2–3 shift valve actuating force that tends to move the 2–3 shift valve element in a downward direction. This force is opposed, however, by a valve spring 432 situated between valve land 424 and a shift valve insert 434. This insert includes a central bore within which is telescopically received a valve element 436. The 2–3 shift valve element is engaged by valve member 436, the latter being urged in an upward direction by a modulator valve spring 438. This spring acts also upon a throttle pressure modulator valve element 440 which is received slidably in telescopic relationship within the cooperating bore in the insert 434.

Torque demand sensitive throttle pressure is distributed to the lower end of the bore in the insert 434 through a throttle pressure passage 442. Modulator valve element 440 reduces the pressure in passage 442 and distributes it to previously mentioned passage 362, the latter communicating with a port in the sleeve 434, as indicated. This reduced pressure in passage 362 also communicates with a port that extends to the interior of the bore in insert 434 within which valve member 436 is situated. This urges the latter in an upward direction, thereby urging the shift valve spool in an upward direction to supplement the action of the valve spring 432.

When the vehicle speed is sufficiently high for any given engine torque demand to overcome the opposing influence of the spring 432 and the throttle pressure forces acting upon the 2-3 shift valve element, the 2-3 shift valve element will assume a downward position thereby causing valve land 418 to block passage 382 and exhaust passage 392 through exhaust port 426. This causes the front servo to become released immediately. The volumetric capacity of the front servo can be of reduced magnitude since it is only required to accommodate reaction torque under coasting conditions. Since its capacity is reduced and since the connection between port 426 and the pressure chamber for the front servo is direct, the front servo becomes released immediately upon shifting movement of the 2-3 shift valve element.

As the 2-3 shift valve element moves in a downward direction, valve land 420 blocks exhaust passage 358 and communication is established between passage 428 and passage 430 as valve land 422 uncovers passage 430. Line pressure then is introduced into passage 428 which causes the rear clutch to become applied.

It should be remembered at this point that the intermediate coupling servo remains applied. Therefore, the shuttle valve continues to assume an open position. Since this is the case, pressure is distributed through passage 386 and through the shuttle valve directly to passage 388. Passage 386, of course, is pressurized with the same pressure that is applied to the rear clutch upon movement of the 2-3 shift valve in a downward direction. The scheduling valve and the controller valve then will function to establish an accumulating action for the rear clutch in the same way that they provided an accumulating action during engagement of the intermediate coupling servo. Thus, as rear clutch pressure increases following shifting movement of the 2-3 shift valve, the pressure in passage 388 will increase accordingly.

This pressure is applied to the lower end of the scheduling valve spool 396. After a predetermined pressure build-up has occurred, exhaust port 400 will open. A pressure build-up occurs, however, at the upper end of the scheduling valve chamber in the manner previously described. This pressure build-up also occurs at the right hand end of the controller valve chamber. Thus, the controller valve spring, as it yields under the influence of pressure, will result in a variable pressure that acts upon the upper end of the scheduling valve spool 396. This, in turn, results in a progressively variable rate of pressure build-up in the rear clutch since the rate at which fluid is discharged from passage 388 through the exhaust port 400 is controlled as a function of the pressure build-up itself.

Since the front clutch and the rear clutch both are applied, the transmission mechanism is conditioned for direct drive high speed operation.

Upon a downshift resulting from an increase in engine torque demand for any given vehicle speed, the 2-3 shift valve will move again to the position shown in the drawings. This causes the rear clutch to become exhausted through passage 428, passage 358 and port 356. The intermediate coupling servo is capable of accommodating the torque reaction of the gear unit as the sun gear decreases in angular velocity and becomes zero. At that instant the overrunning coupling, shown in part at 168, transfers reaction torque to the race 166 and, hence, to the transmission casing. At this time the front brake servo also becomes applied since the passage 392 again is brought into communication with passage 382 which, of course, communicates with passage 380 through the shuttle valve chamber.

To condition the transmission mechanism for reverse drive operation, it merely is necessary to move the manual valve to the R position. Manual valve land 278 then will block exhaust port 356 and land 276 will uncover passage 262. Thus passage 358 will become pressurized. This passage communicates with passage 428 through the 2-3 shift valve chamber, and the latter distributes control pressure to the rear clutch. Control pressure is distributed also to passage 352. This passage in turn communicates with passage 292 through the rear servo lockout valve when the latter assumes a downward position. Thus the rear servo and the rear clutch both are applied and the transmission mechanism is conditioned for reverse drive operation.

Since passage 340 is pressurized in the manner previously described, the transition valve will assume an upward position thereby causing passage 336 and the intermediate coupling servo to become exhausted through transition valve exhaust port 338.

The passage 280, which communicates with the lower end of the rear servo lock-out valve chamber, is exhausted through the left hand end of the manual valve chamber. Thus the rear servo lock-out valve is rendered ineffective to prevent application of the rear servo.

If the manual valve is moved to the D2 position, valve land 276 will prevent distribution of pressure to the 1-2 shift valve feed passage 352. At the same time, however, the land 276 will permit communication between passage 352 and exhaust port 356. Thus the passage 340 also is exhausted and the transition valve will assume a downward position. This allows the transmission mechanism to accelerate from a standing start in the second speed ratio. Another valve spring 506 is situated between a stationary shoulder in the compensator valve chamber and the compensator valve element to urge the latter in a right hand direction, as viewed in FIGURE 5a.

Line pressure is distributed to the compensator valve chamber through a passage 508 which communicates with the main control passage 262. An exhaust port is shown at 510. The manifold pressure sensitive signal in passage 458 acts upon a differential area defined by the valve lands 496 and 498 and thus tends to urge normally the compensator valve element in a left hand direction, as viewed in FIGURE 5a. This force is opposed by the governor pressure force acting upon plug 500. An increase in engine manifold sensitive pressure for any given governor pressure will tend to decrease the degree of communication between the compensator valve chamber and passage 508. Conversely, an increase of governor pressure for any given manifold pressure sensitive signal will tend to increase the communication between passage 508 and the compensator valve chamber. Thus a modulating action is established in the compensator valve. The output pressure is distributed to a compensator pressure passage 512. The same pressure is fed back to the compensator valve chamber and acts upon a differential area defined by valve lands 494 and 496.

The compensator pressure is distributed through passage 512 to the lower end of the main oil pressure regulator valve and the lower end of the low oil pressure regulator valve. The valve elements for each regulator valve are urged upwardly by the compensator pressure to oppose the action of their respective valve springs. Thus, as compensator pressure increases, the regulated pressure maintained by each of these valves decreases. Conversely, as compensator pressure decreases, the regulated pressure level for each regulator valve increases.

A compensator cut-back element is shown at 514. It comprises a valve chamber within which is situated a valve element having a pair of valve lands 516 and 518. Line pressure acts upon the differential area defined by these lands and thus tends normally to urge the valve element in a right hand direction. Governor pressure acts upon the right hand end of the compensator cut-back element. When governor pressure is sufficiently high, the cut-back element moves in a left hand direction into engagement with the compensator valve element so that the governor pressure force acting upon it will oppose and balance the governor pressure force acting upon the plug 500. The compensator valve then is less sensitive to further changes in governor pressure. The regulated control pressure then is not reduced in value to the same degree as the vehicle speed increases to a relatively high value and the clutch and brake servos then will not lose capacity as a result of an increase in speed.

Whenever the rear servo is actuated, rear servo pressure is distributed through the rear servo lock-out valve from passage 292 to passage 520. This occurs when the transmission is conditioned for manual low speed operation or reverse drive. This passage 520 communicates with the right hand end of the compensator valve chamber and establishes a pressure force upon the compensator valve element to urge it in a left hand direction, as viewed in FIGURE 5a. This results in a reduction in compensator pressure to approximately zero. This compensator pressure reduction then results in an artificial increase in the magnitude of the pressure level maintained by the main oil pressure regulator valve and the low oil pressure regulator valve. The necessary increase in capacity in the clutch and brake servos then is accomplished.

As the manual valve is moved to the L position, control pressure is distributed through passage 352 and through the 1–2 shift valve to passage 340 and then passes through the rear servo lock-out valve to passage 292 which causes the rear servo to become applied. The passage 280, of course, is exhausted so that the rear servo lock-out valve will assume the position shown in FIGURE 5b. As this occurs, line pressure is boosted in the manner previously described.

*Description of structure of FIGURES 10a and 10b*

The control system described with reference to FIGURES 4 through 9 can be applied also to the transmission structure of FIGURES 10a and 10b. Like the transmission structure of FIGURES 1, 2 and 3, the structure of FIGURES 10a and 10b is capable of providing three forward driving speed ratios and a single reverse speed ratio. The speed ratio shifts are accomplished by corresponding clutch and brake members. In this instance, however, the rear clutch of the structure of FIGURES 1 through 3 corresponds to the front clutch in the structure of FIGURES 10a and 10b. Conversely, the front clutch in the structure of FIGURES 1, 2 and 3 corresponds to the rear clutch in the structure of FIGURES 10a and 10b.

The front servo of the structure of FIGURES 1, 2 and 3 has a corresponding front servo in the structure of FIGURES 10a and 10b. Furthermore, the intermediate coupling servo and the rear servo of the structure of FIGURES 1, 2 and 3 each have a direct counterpart in the structure of FIGURES 10a and 10b.

Numeral 600 designates generally a power input shaft which may be a crankshaft for an internal combustion vehicle engine. It is connected drivably to a drive plate 602 which, in turn, is connected by bolts 604 to an impeller shell 606. This shell corresponds to impeller shell 180 in FIGURE 5a.

Situated within the shell 606 is a bladed turbine member and a bladed impeller member that correspond in structure and in function to the impeller and turbine members described with reference to FIGURE 5a. The impeller member is connected to a supporting sleeve shaft 608 which is journaled within a wall 610 that is connected by bolts 612 to a transmission casing 614. A fluid seal 616 is provided, as indicated. Wall 610 defines a pump chamber 618 within which is situated a pair of positive displacement pump elements 620 and 622. Element 620 is keyed to shaft 608 and is driven thereby.

The turbine member, which is situated in toroidal fluid flow relationship with respect to the impeller member, is connected to a turbine hub 624 which, in turn, is splined to a turbine shaft 626 extending axially through wall 610. Connected also to wall 610 is stationary adapter 628, suitable bolts 630 being provided for this purpose. Adapter 628 comprises a stationary stator sleeve shaft 632 to which is splined an inner race 634 for an overrunning brake. An outer race 636 may be connected to the hub of the stator for the torque converter unit.

Rollers 638 are situated between the races 634 and 636 to inhibit rotation of the stator in one direction. Thrust members 639 and 641 are disposed on either side of the races 634 and 636 and act against the hubs for the impeller and the turbine members.

Stationary adaptor 628 includes also an extension 640 upon which is journaled a brake drum 642. This drum defines an annular cylinder 644 within which is positioned an annular piston 646. Pressure may be admitted selectively to the pressure chamber defined by the cylinder 644 and the piston 646. Piston return springs 648 may be situated between the stationary spring anchor member and the piston 646.

A clutch member 650 is splined to the end of turbine shaft 626 and includes an externally splined extension 652 and an internally splined clutch drum 654. This member 650 is journaled also upon stationary extension 640. A thrust washer 656 can be situated between the end of extension 640 and the member 650.

Internally splined clutch discs are carried by the extensions 652. They cooperate in interdigital relationship with respect to externally splined clutch discs that are carried by an internally splined drum 642.

A brake band 658 encircles drum 642 and may be applied selectively by a front brake servo of the type previously described.

The clutch member 660 is externally splined and carries internally splined clutch discs which cooperate with externally splined clutch discs in interdigital relationship. The externally splined clutch discs are carried by the internal splines of drum 654.

Drum 654 defines an annular cylinder 662 within which is disposed an annular piston 664. This piston and cylinder cooperate to define a pressure chamber that may be selectively pressurized and exhausted. When it is pressurized, a driving connection is established between drum 654 and clutch member 660. A clutch pressure back-up member 666 is carried by drum 654 to accommodate the clutch engaging force. In a similar fashion, a clutch pressure back-up member 668 is provided for the other clutch assembly and is carried by clutch drum 642.

Clutch member 660 is connected to a ring gear 670 for a first planetary gear unit. Gear 670 is engaged by a set of planet pinions 672 that are carried by pinion shafts 674. These shafts in turn are supported by carrier 676 which is splined to driven member or power output member 678. The pinions 672 engage a sun gear 680 which in turn is connected to another sun gear 682. Suitable bushings 684 and 686 rotatably support the common sun gears for rotation about the shaft 678.

Brake drum 642 is drivably connected to the common sun gears by means of a drive shell 686 which envelopes the multiple disc clutch shown in part at 654 and 660 and the first gear unit. Drum 642 thus rotates in unison with the common sun gears.

Sun gear 682 engages a set of planet pinions 688 which are rotatably journaled upon planet pinion shafts 690. Shafts 690 in turn are carried by a carrier shown in part at 692.

Pinions 688 engage also a ring gear for a second gear unit, as shown at 694. This ring gear in turn is connected to and supported by a drive member 696 which is splined, as shown, to power output shaft 678.

Carrier 692 is positively connected to a brake drum 698 about which is positioned a brake band 700. This brake band 700 corresponds in function to the rear brake band described previously. It may be operated by a rear servo in the manner previously described.

Brake drum 698 includes an extension 702 that is journaled by means of bushing 704 to a wall 706 situated as shown between the gear units. The wall may be connected at its outer periphery to the casing 614.

Wall 706 includes an extension 708 that is splined to an inner race 710 for an overrunning coupling. This coupling includes also an outer race 712 which is carried by and connected to brake drum 698. Disposed between the races 710 and 712 is a series of rollers 714. One of the races may be cammed to permit camming engagement with the rollers 714. This prevents rotation of the brake drum 698 in one direction, but freewheeling motion in the opposite direction is accommodated.

Wall 706 defines an annular cylinder 718 within which is disposed an annular piston 720. This cylinder 718 and the piston 720 cooperate to define a pressure chamber which corresponds to the pressure chamber for the previously described intermediate coupling servo.

A coupling back-up member 722 is connected positively to the interior of the casing 614. Connected also to the casing 614 are angularly spaced, internally splined, stationary coupling members 724 which have connected thereto externally splined coupling discs. These discs are situated in interdigital relationship with respect to internally splined discs that are carried by an overrunning coupling race 726. The overrunning coupling of which race 726 is a part includes also an inner race 728 which in turn is splined positively to the common sun gears 680 and 682. Disposed between races 726 and 728 is a plurality of sprags or rollers 730 which establish one-way braking action between the races but permit overrunning motion thereof in the opposite direction.

Annular piston 720 has angularly spaced radial projections 720' disposed between the angularly spaced members 724. Springs 719 act upon these projections to urge the piston 720 normally in a right hand direction.

Thus, as pressure is admitted to the pressure chamber defined by the piston 720 and the annular cylinder 718, the common sun gears will become anchored against the casing to inhibit rotation in one direction, although they will be permitted to move in a freewheeling fashion in the opposite direction.

Reference character 732 indicates generally a tailshaft driven governor. This corresponds in function to the governor 312 described with reference to FIGURE 5b. It may be carried by a sleeve 734 that may be connected to drive member 696. Sleeve 734 in turn can be journaled for rotation about an extension 736 that forms a part of an end wall 738 which is secured by bolts 740 to the rearward portion of the transmission casing 614. The rear pump is indicated generally at 742. This corresponds in function to the rear pump described with reference to FIGURE 5b.

To establish first speed ratio operation, it merely is necessary to engage the rear clutch. It should be remembered that this rear clutch corresponds in function to the front clutch described with reference to FIGURES 1, 2 and 3. Turbine torque then is delivered to the ring gear 670. The resulting carrier torque is distributed directly to the power output shaft. The reaction torque causes the common sun gears to rotate in a reverse direction. Carrier 692 is anchored by the overrunning coupling shown in part at 714. Thus the ring gear 694 is driven in a forward direction and its torque is added to the torque delivered to the driven shaft 678 by the carrier for the first gear unit. A split torque drive then is established.

To shift from the first speed ratio to the second speed ratio it is merely necessary to hold the common sun gears stationary. This is done by energizing the intermediate coupling servo by pressurizing its pressure chamber. This anchors the race 726 and reaction torque then is distributed to the anchored race 726 through the overrunning coupling elements 730. The transmission then is conditioned for intermediate speed ratio operation. The overrunning coupling shown in part at 714 overruns under these conditions. Thus a shift is obtained from the lowest ratio to the intermediate speed ratio in a non-synchronous fashion.

To establish high speed ratio operation it merely is necessary to engage the front clutch. This, of course, corresponds to the rear clutch described with reference to FIGURES 1, 2 and 3. Under these conditions, the planetary gear unit is locked-up for rotation in unison. This causes forward rotation of the common sun gears with the turbine shaft. The overrunning coupling shown in part at 730 permits this overrunning motion to take place. Thus a shift from the second speed ratio to the high speed ratio, like the previous shift, is non-synchronous in fashion.

The brake band 658 may be applied following a 1–2 shift, but, like the foot brake of the previous embodiment, it is applied with a delayed action. It is released, however, prior to completion of the 2–3 shift so that the 2–3 shift is fully non-synchronous. Brake band 642 thus is used for the purpose of establishing a coast brake condition in intermediate drive ratio.

The brake band 700, as previously mentioned, corresponds in function to the previously described brake band 142 to establish manual low driving operation or reverse driving operation.

Having thus described preferred embodiments of our invention, what we claim is:

1. In a valve system, an accumulator arrangement comprising a pair of fluid pressure operated servos, a fluid pressure source, conduit structure interconnecting said servos and said source including separate portions extending to each servo, a first fluid pressure distributor valve means disposed in and partly defining one conduit structure portion for selectively establishing and interrupting fluid pressure distribution to one of said servos, a second fluid pressure distributor valve means disposed in and partly defining the second of said conduit structure portions for selectively establishing and interrupting fluid pressure distribution to the other of said servos, a branch passage in fluid communication with said one servo, an exhaust port in said branch passage, a scheduling valve means disposed in and partly defining said branch passage for establishing controlled communication between said branch passage and said port, said scheduling valve means comprising a movable valve element adapted to restrict progressively said port upon movement thereof in one direction and to uncover progressively said port upon movement thereof in the opposite direction, said branch passage being in fluid communication with two opposed fluid pressure surfaces of said valve element whereby a pressure build-up in said branch passage will be accompanied by a pressure force acting upon said valve element to urge the latter in said one direction toward a port closing position, and a shuttle valve means communicating with said one servo and responsive to a pressure build-up therein for establishing communication between said second servo and said branch passage and interrupting communication between said one servo and said branch passage, said scheduling valve means thereby being effective to modify at different times the rate of application of each servo.

2. In a valve system, an accumulator arrangement comprising a pair of fluid pressure operated servos, a fluid pressure source, conduit structure interconnecting said servo and said source including separate portions extending to each servo, a first fluid pressure distributor valve means disposed in and partly defining one conduit structure portion for selectively establishing and interrupting fluid pressure distribution to one of said servos, a second fluid pressure distributor valve means disposed in and partly defining a second of said conduit structure portions for selectively establishing and interrupting fluid pressure distribution to the other of said servos, a branch passage in fluid communication with said one servo, an exhaust port in said branch passage, a scheduling valve means disposed in and partly defining said branch passage for establishing controlled communication between said branch passage and said port, said scheduling valve means comprising a movable valve element adapted to restrict progressively said port upon movement thereof in one direction and to uncover progressively said port upon movement thereof in the opposite direction, said branch passage being in fluid communication with two opposed fluid pressure surfaces of said valve element whereby a pressure build-up in said branch passage will be accompanied by a pressure force acting upon said valve element to urge the latter toward a port closing position, a valve spring acting upon said scheduling valve element to urge normally the latter toward a port closing position to augment the pressure force resulting from a fluid pressure build-up in said branch passage, and a shuttle valve means communicating with said one servo and responsive to a pressure build-up therein for establishing communication between said second servo and said branch passage and interrupting communication between said one servo and said branch passage, said scheduling valve means thereby being effective to modify at different times the rate of application of each servo.

3. In a valve system, an accumulator arrangement comprising a pair of fluid pressure operated servos, a fluid pressure source, conduit structure interconnecting said servo and said source including separate portions extending to each servo, a first fluid pressure distributor valve means disposed in and partly defining one conduit structure portion for selectively establishing and interrupting fluid pressure distribution to one of said servos, a second fluid pressure distributor valve means disposed in and partly defining a second of said conduit structure portions for selectively establishing and interrupting fluid pressure distribution to the other of said servos, a branch passage in fluid communication with said one servo, an exhaust port in said branch passage, a scheduling valve means disposed in and partly defining said branch passage for establishing controlled communication between said branch passage and said port, said scheduling valve means comprising a movable valve element adapted to restrict progressively said port upon movement thereof in one direction and to uncover progressively said port upon movement thereof in the opposite direction, said branch passage being in fluid communication with two opposed fluid pressure surfaces of said valve element whereby a pressure build-up in said branch passage will be accompanied by a pressure force acting upon said valve element to urge the latter toward a port closing position, a controller valve comprising a valve chamber, a movable valve element situated in said valve chamber and cooperating therewith to define a pressure chamber of variable volume, means for biasing said movable valve element in one direction thereby tending to decrease the effective volume of said chamber, said chamber being in fluid communication with said branch passage, and a shuttle valve means communicating with said one servo and responsive to a pressure build-up therein for establishing communication between said second servo and said branch passage and interrupting communication between said one servo and said branch passage, said scheduling valve means thereby being effective to modify at different times the rate of application of each servo.

4. In a valve system, an accumulator arrangement comprising a pair of fluid pressure operated servos, a fluid pressure source, conduit structure interconnecting said servo and said source including separate portions extending to each servo, a first fluid pressure distributor valve means disposed in and partly defining one conduit structure portion for selectively establishing and interrupting fluid pressure distribution to one of said servos, a second fluid pressure distributor valve means disposed in and partly defining a second of said conduit structure portions for selectively establishing and interrupting fluid pressure distribution to the other of said servos, a branch passage in fluid communication with said one servo, an exhaust port in said branch passage, a scheduling valve means disposed in and partly defining said branch passage for establishing controlled communication between said branch passage and said port, said scheduling valve means comprising a movable valve element adapted to restrict said port upon movement thereof in one direction and to uncover said port upon movement thereof in the opposite direction, said branch passage being in fluid communication with two opposed fluid pressure surfaces of said valve element whereby a pressure build-up in said branch passage will be accompanied by a pressure force acting upon said valve element to urge the latter toward a port closing position, a valve spring acting upon said scheduling valve element to urge normally the latter toward a port closing position to augment the pressure force resulting from a fluid pressure build-up in said branch passage, a controller valve comprising a valve chamber, a movable valve element situated in said valve chamber and cooperating therewith to define a pressure chamber of variable volume, means for biasing said movable valve element in one direction thereby tending to decrease the effective volume of said chamber, a restricted fluid flow passage connecting said chamber with said branch passage, and a shuttle valve means communicating with said one servo and responsive to a pressure build-up therein for establishing communication between said second servo and said branch passage and interrupting communication between said one servo and said branch passage, said scheduling valve means thereby being effective to modify at different times the rate of application of each servo.

5. In a valve system for controlling the operation of fluid pressure operated servos, a fluid pressure source, conduit structure interconnecting said pressure source and each of said servos including separate portions extending to each servo, distributor valve means disposed in and partly defining said conduit structure for selectively establishing and interrupting fluid pressure distribution to one of said servos, an accumulator system in fluid communication with the portion of said conduit structure extending to one servo whereby the rate of pressure buildup in said one servo is modified upon actuation of said distributor valve means, and shuttle valve means situated in and partly defining that portion of said conduit structure extending from said distributor valve means to another servo, said shuttle valve means being responsive to the pressure build-up in said first mentioned conduit structure portion to establish pressure distribution to said other servo when the pressure build-up in said one servo is greater than a predetermined value for any given operating condition.

6. In a valve system for controlling the operating of fluid pressure operated servos, a fluid pressure source, conduit structure interconnecting said pressure source and each of said servos including separate portions extending to each servo, distributor valve means disposed in and partly defining said conduit structure for selectively establishing and interrupting fluid pressure distribution to one of said servos, an accumulator system in fluid communication with a first portion of said conduit structure extending to one servo whereby the rate of pressure build-up in said one servo is modified upon actuation of said distributor valve means, shuttle valve means situated in and partly defining a second portion of said conduit structure extending to another servo, said shuttle valve means being responsive to the pressure build-up in said first mentioned conduit structure portion to establish pressure distribution to said other servo when the pressure build-up in said one servo is greater than a predetermined value for any given operating condition, said accumulator system comprising a branch passage in fluid communication with said first conduit structure portion, a scheduling valve means disposed in and partly defining said branch passage including a shiftable valve element and a fluid exhaust port communicating with said branch passage, said valve element being adapted to restrict said port upon movement thereof in one direction and to increase the degree of communication between said branch passage and said port upon movement thereof in the opposite direction, opposed fluid pressure surfaces of said valve element being in fluid communication with said branch passage whereby the rate of pressure build-up in said branch passage occurs at a variable rate that is dependent upon the magnitude of the net fluid pressure force acting upon said valve element to urge the latter to a port restricting position.

7. In a valve system for controlling the operating of fluid pressure operated servos, a fluid pressure source, conduit structure interconnecting said pressure source and each of said servos including separate portions extending to each servo, distributor valve means disposed in and partly defining said conduit structure for selectively establishing and interrupting fluid pressure distribution to one of said servos, an accumulator system in fluid communication with the portion of said conduit structure extending to one servo whereby the rate of pressure build-up in said one servo is modified upon actuation of said distributor valve means, shuttle valve means situated in and partly defining the portion of said conduit structure extending to another servo, said shuttle valve means being responsive to the pressure build-up in said first mentioned conduit structure portion to establish pressure distribution to said other servo when the pressure build-up in said one servo is greater than a predetermined value for any given operating condition, said accumulator system comprising a branch passage disposed in fluid communication with said first servo, an exhaust port in said branch passage, a scheduling valve chamber, a scheduling valve element disposed in said valve chamber, said valve element being adapted to restrict said exhaust port upon movement thereof in one direction, and spring means for biasing said valve element in said one direction, opposed regions of said valve chamber being subjected to the pressure build-up in said branch passage whereby the rate of pressure build-up in said first servo occurs at a non-linear rate.

8. In a valve system for controlling the operating of fluid pressure operated servos, a fluid pressure source, conduit structure interconnecting said pressure source and each of said servos including separate portions extending to each servo, distributor valve means disposed in and partly defining said conduit structure for selectively establishing and interrupting fluid pressure distribution to one of said servos, an accumulator system in fluid communication with the portion of said conduit structure extending to one servo whereby the rate of pressure build-up in said one servo is modified upon actuation of said distributor valve means, shuttle valve means situated in and partly defining the portion of said conduit structure extending to another servo, said shuttle valve means being responsive to the pressure build-up in said first mentioned conduit structure portion to establish pressure distribution to said other servo when the pressure build-up in said one servo is greater than a predetermined value for any given operating condition, said accumulator system comprising a branch passage in fluid communication with said first servo, a scheduling valve means disposed in and partly defining said branch passage including a shiftable valve element and a fluid exhaust port communicating with said branch passage, said valve element being adapted to restrict said port upon movement thereof in one direction and to increase the degree of communication between said branch passage and said port upon movement thereof in the opposite direction, opposed fluid pressure surface of said valve element being in fluid communication with said branch passage whereby the rate of pressure build-up in said branch passage occurs at a variable rate that is dependent upon the magnitude of the net fluid pressure force acting upon said valve element to urge the latter to a port restricting position, a controller valve means in fluid communication with said branch passage comprising a valve chamber, a movable valve element disposed within said chamber and cooperating with said chamber to define an accumulator pressure cavity, and spring means for biasing said valve element in one direction to decrease the volume of said pressure cavity.

9. In a valve system for controlling the operation of fluid pressure operated servos, a fluid pressure source, conduit structure interconnecting said pressure source and each of said servos including separate portions extending to each servo, distributor valve means disposed in and partly defining said conduit structure for selectively establishing and interrupting fluid pressure distribution to one of said servos, an accumulator system in fluid communication with the portion of said conduit structure extending to one servo whereby the rate of pressure build-up in said one servo is modified upon actuation of said distributor valve means, shuttle valve means situated in and partly defining the portion of said conduit structure extending to another servo, said shuttle valve means being responsive to the pressure build-up in said first mentioned conduit structure portion to establish pressure distribution to said other servo when the pressure build-up in said one servo is greater than a predetermined value for any given operating condition, said accumulator system comprising a branch passage in fluid communication with said first servo, a scheduling valve chamber, an exhaust port in said valve chamber, said valve chamber being in fluid communication with said branch passage, a valve element disposed in said valve chamber and adapted to restrict said exhaust port upon movement thereof in one direction, spaced portions of said valve chamber being subjected to the pressure build-up in said branch passage, a controller valve comprising a valve chamber and a controller valve element disposed in said valve chamber and cooperating therewith to define an accumulator cavity, a restricted fluid flow passage connecting said cavity with said branch passage, and a controller valve spring acting upon said controller valve element to urge the latter in one direction to decrease the effective volume of said accumulator cavity.

10. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, a third element of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a fluid pressure source, conduit structure connecting said source and said friction coupling means, a fourth element of said gear unit being adapted to accommodate driving torque reaction during operation in a relatively low speed ratio, brake means for anchoring said fourth element against a stationary portion of said mechanism, said friction coupling means being adapted to accommodate rotation of said third element in one direction when said mechanism is conditioned for operation in said low speed ratio, said friction coupling means and said coupling elements defining in part a torque reaction path between said third element and said stationary portion of said mechanism during operation in said intermediate speed ratio, second clutch means for connecting two elements of said gear assembly to a common torque delivery member to establish high speed ratio direct drive operation, said coupling elements accommodating overrunning motion of said third element in the opposite direction during operation in said high speed ratio, and valve means disposed in and partly defining said conduit structure for controlling sequentially distribution of fluid pressure to said friction coupling means and said second clutch means, a friction brake means having a pressure operated brake servo for anchoring said third element against rotation in both directions, a branch passage in fluid communication with said conduit structure extending to said brake servo, and a shuttle valve means disposed in part in said branch passage for controlling distribution of pressure to said brake servo in response to a pressure change in said friction coupling means.

11. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, a third element of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a fluid pressure source, conduit structure connecting said source and said friction coupling means, a fourth element of said gear unit being adapted to accommodate driving torque reaction during operation in a relatively low speed ratio, brake means for anchoring said fourth element against a stationary portion of said mechanism, said friction coupling means being adapted to accommodate rotation of said third element in one direction when said mechanism is conditioned for operation in said low speed ratio, said friction coupling means and said coupling elements defining in part a torque reaction path between said third element and said stationary portion of said mechanism during operation in said intermediate speed ratio, second clutch means for connecting two elements of said gear assembly to a common torque delivery member to establish high speed ratio direct drive operation, said coupling elements accommodating overrunning motion of said third element in the opposite direction during operation in said high speed ratio, shift valve means responsive to changes in operating variables for controlling distribution of fluid pressure to said friction coupling means and said second clutch means in sequence, a pressure accumulator valve system, a branch passage extending to said accumulator valve system, and shuttle valve means communicating with said friction coupling means for alternately connecting said branch passage to said friction coupling means and to said second clutch means.

12. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, third and fourth elements of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a fluid pressure source, conduit structure connecting said source and said friction coupling means, said fourth element of said gear unit being adapted to accommodate driving torque reaction during operation in a relatively low speed ratio, brake means for anchoring said fourth element against a stationary portion of said mechanism, said fluid pressure operated friction coupling means being adapted to accommodate rotation of said third element in one direction when said mechanism is conditioned for operation in said low speed ratio, valve means disposed in and partly defining said conduit structure for controlling distribution of pressure selectively to said friction coupling means to inhibit rotation of said third element in said one direction thereby conditioning said mechanism for operation in an intermediate speed ratio, said coupling elements defining in part a torque reaction path between said third element and said stationary portion of said mechanism during operation in said intermediate speed ratio, second valve controlled clutch means for connecting two elements of said gear assembly to a common torque delivery member to establish high speed ratio operation, said overrunning coupling elements accommodating overrunning motion of said third element in the opposite direction during operation in said high speed ratio, a friction brake means having a pressure operated brake servo for anchoring said third element against rotation in both directions, a branch passage in fluid communication with said conduit structure extending to said brake servo, and a shuttle valve means disposed in part in said branch passage for controlling distribution of pressure to said brake servo in response to a pressure change in said friction coupling means.

13. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, a third element of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a fluid pressure source, conduit structure connecting said source and said friction coupling means, a fourth element of said gear unit being adapted to accommodate driving torque reaction during operation in a relatively low speed ratio, brake means for anchoring said fourth element against a stationary portion of said mechanism, said fluid pressure operated friction coupling means being adapted to accommodate rotation of said third element in one direction when said mechanism is conditioned for operation in said low speed ratio, valve means disposed in and partly defining said conduit structure for controlling distribution of pressure selectively to said friction coupling means to inhibit rotation of said third element in said one direction thereby conditioning said mechanism for operation in an intermediate speed ratio, said coupling elements defining in part a torque reaction path between said third element and said stationary portion of said mechanism during operation in said intermediate speed ratio, second clutch means for connecting two elements of said gear assembly to a common torque delivery member to establish high speed ratio operation, said overrunning coupling elements accommodating overrunning motion of said third element in the opposite direction during operation in said high speed ratio, a branch passage in fluid communication with said friction coupling means, a scheduling valve having a chamber communicating with said branch passage and an exhaust port, a scheduling valve element disposed in said chamber and adapted to restrict said port upon movement thereof in one direction, each side of said valve element being subjected to the pressure build-up in said branch passage whereby the net fluid pressure force acting upon said valve element tends to restrict said exhaust port at a rate that is dependent upon the rate of pressure build-up in said branch passage, spring means for normally biasing said valve element to an exhaust port closing position to supplement the net fluid pressure force acting on said valve element and a shuttle valve means communicating with said friction coupling means for alternately connecting said branch passage to said friction coupling means and said second clutch means in response to a pressure change in said friction coupling means.

14. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, a third element of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a fluid pressure source, conduit structure connecting said source and said friction coupling means, a fourth element of said gear unit being adapted to accommodate driving torque reaction during operation in a relatively low speed ratio, brake means for anchoring said fourth element against a stationary portion of said mechanism, said friction coupling means being adapted to accommodate rotation of said third element in one direction when said mechanism is conditioned for operation in said low speed ratio, valve means disposed in and partly defining said conduit structure for controlling distribution of pressure selectively to said friction coupling means to inhibit rotation of said third element in said one direction thereby conditioning said mechanism for operation in an intermediate speed ratio, said coupling elements defining in part a torque reaction path between said third element and said stationary portion of said mechanism during operation in said intermediate speed ratio, second clutch means for connecting two elements of said gear assembly to a common torque delivery member to establish high speed ratio operation, said coupling elements accommodating overrunning motion of said third element in the opposite direction during operation in said high speed ratio, a branch passage in fluid communication with said friction coupling means, a scheduling valve having a chamber communicating with said branch passage and an exhaust port, a scheduling valve element disposed in said chamber and adapted to restrict said port upon movement thereof in one direction, opposed sides of said valve element being subjected to the pressure build-up in said branch passage whereby the net fluid pressure force acting on said valve element tends to restrict said exhaust port at a rate that is dependent upon the rate of pressure build-up in said branch passage, a controller valve means comprising a valve chamber disposed in fluid communication with said branch passage, a controller valve element disposed in said valve chamber and defining therewith a pressure cavity of variable volume, spring means for biasing said controller valve element in one direction thereby tending to decrease said volume, a friction brake means having a pressure operated brake servo for anchoring said third element against rotation in both directions, and a shuttle valve means disposed in part in said branch passage for controlling distribution of pressure to said brake servo in response to a pressure change in said friction coupling means.

15. In a multiple speed ratio power transmission mechanism comprising a driving member, a driven member, a gear assembly, selectively engageable clutch means for establishing a driving connection between said driving member and a power input element of said gear assembly, a second element of said gear assembly being connected to said driven member, a third element of said gear assembly being adapted to accommodate driving torque reaction, an overrunning coupling having two races with coupling elements disposed therebetween, said third element being connected to one race, fluid pressure operated friction coupling means for connecting the other race selectively to a stationary portion of said mechanism, a control fluid pressure source, source of pressure signals that are related in magnitude to separate operating variables, conduit structure connecting said control fluid pressure source and said friction coupling means, a fourth element of said gear unit being adapted to accommodate driving torque reaction during operation in a relatively low speed ratio, brake means for anchoring said fourth element against a stationary portion of said mechanism, said friction coupling means being adapted to accommodate rotation of said third element in one direction when said mechanism is conditioned for operation in said low speed ratio, valve means disposed in and partly defining said conduit structure including a first portion adapted to distribute pressure selectively to said friction coupling means to inhibit rotation of said third element in said one direction thereby conditioning said mechanism for operation in an intermediate speed ratio, said coupling elements defining in part a torque reaction path between said third element and said stationary portion of said mechanism during operation in said intermediate speed ratio, pressure sensitive second clutch means for connecting two elements of said gear assembly to a common torque delivery member to establish high speed ratio operation, said coupling elements accommodating overrunning motion of said third element in the opposite direction during operation in said high speed ratio, said valve means including a second portion adapted to distribute selectively fluid pressure to said second clutch means, said portions of said valve means being sensitive to and actuated in sequence by said signals, a friction brake means having a pressure operated brake servo for anchoring said third element against rotation in both directions, a branch passage in fluid communication with said conduit structure extending to said brake servo, and a shuttle valve means disposed in part in said branch passage for controlling distribution of pressure to said brake servo in response to a pressure change in said friction coupling means.

16. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling, an overrunning coupling comprising first and second races and overrunning coupling elements disposed therebetween, one race being connected to the other sun gear and the other race being connected to and forming a part of said friction coupling, said friction coupling being adapted to anchor said other race to said stationary portion, second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second clutch means and said friction coupling respectively, and separate fluid pressure distributor valves disposed in said separate conduit structure portions and responsive to control variables for controlling distribution of pressure to said second clutch means and said friction coupling to establish sequential operation of the same, fluid pressure operated friction brake means for anchoring said other sun gear against rotation in either direction, a branch passage communicating with the conduit structure portion for said friction coupling and extending to said friction brake means, and shuttle valve means disposed in said branch passage and responsive to the pressure applied to said friction coupling for controlling pressure distribution to said friction brake means.

17. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling means, an overrunning coupling comprising first and second races and overrunning coupling elements disposed therebetween, one race being connected to the other sun gear and the other race being connected to and forming a part of said friction coupling means, said friction coupling means being adapted to anchor said other race to said stationary portion, second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling means is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second coupling means and friction coupling means respectively, separate fluid pressure distributor valve means responsive to control variables for controlling distribution of pressure to said second clutch means and said friction coupling means to establish sequential operation of the same, said conduit structure comprising a branch passage communicating with said friction coupling means, an exhaust port in said branch passage, a scheduling valve means disposed in and partly defining said branch passage for establishing controlled communication between said branch passage and said port, means responsive to a pressure build-up in said branch passage for varying the rate of fluid by-pass flow through said port and a shuttle valve means communicating with said friction coupling means and responsive to a change in pressure therein for alternately connecting said branch passage to said coupling means and said second clutch means.

18. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling means, an overrunning coupling comprising first and second races and overrunning coupling elements disposed therebetween, one race being connected to the other sun gear and the other race being connected to and forming a part of said friction coupling means, said friction coupling means being adapted to anchor said other race to said stationary portion, and second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling means is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second coupling means and said friction coupling means respectively, separate fluid pressure distributor valve means responsive to control variables for controlling distribution of pressure to said second clutch means and said friction coupling means to establish sequential operation of the same, a branch passage, means for establishing alternately a fluid connection between said friction coupling means and said second clutch means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict said exhaust port at a rate that is dependent upon the rate of pressure build-up in said branch passage.

19. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling, an overrunning coupling comprising first and second races and overrunning coupling elements disposed therebetween, one race being connected to the other sun gear and the other race being connected to and forming a part of said friction coupling means, said friction coupling means being adapted to anchor said other race to said stationary portion, second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling means is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second coupling means and said friction coupling means respectively, first and second fluid pressure distributor valve means responsive to control variables for controlling distribution of pressure to said second clutch means and said friction coupling means respectively to establish sequential operation of the same, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict said exhaust port at a rate that is dependent upon the rate of pressure build-up in said branch passage, and means responsive to a pressure build-up in said friction coupling means for establishing a fluid connection between said branch passage and second clutch means following movement of said second distributor valve to a pressure distributing position.

20. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectvely engageable friction coupling means, an overrunning coupling comprising first and second races and overrunning coupling elements disposed therebetween, one race being connected to the other sun gear and the other race being connected to and forming a part of said friction coupling means, said friction coupling means being adapted to anchor said other race to said stationary portion, second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling means is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second coupling means and said friction coupling means respectively, separate fluid pressure distributor valves in each conduit structure portion responsive to control variables for controlling distribution of pressure to said second clutch means and said friction coupling means to establish sequential operation of the same, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict flow through said exhaust port at a rate that is dependent upon the rate of pressure build-up in said branch passage, a controller valve means comprising a valve chamber disposed in fluid communication with said branch passage, and a controller valve element disposed in said valve chamber and defining therewith a pressure cavity of variable volume.

21. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling means, an overrunning coupling comprising first and second races and overrunning coupling elements disposed therebetween, one race being connected to the other sun gear and the other race being connected to and forming a part of said friction coupling means, said friction coupling means being adapted to anchor said other race to said stationary portion, second selectively engageable clutch means forming in part a driving torque delivery path between said other sun gear and said turbine, said gear assembly assuming a 1 to 1 driving ratio when said first clutch means and second clutch means are engaged, said gear assembly assuming an intermediate speed ratio when said second clutch means is released and said friction coupling means is applied, said gear assembly assuming a low speed driving ratio when said second clutch means and said friction clutch means are released, a fluid pressure source, conduit structure interconnecting said pressure source with said second clutch means and said friction coupling means, separate portions of said conduit structure extending from a common portion to said second coupling means and said friction coupling means respectively, separate fluid pressure distributor valve means responsive to control variables for controlling distribution of pressure to said second clutch means and said friction coupling means to establish sequential operation of the same, friction brake means for anchoring said second sun gear against rotation in said opposite direction, a brake servo for actuating said brake means, and shuttle valve means communicating with a high pressure region of said circuit and responsive to a pressure build-up in said friction coupling means to establish communication between said high pressure region and said brake servo following application of said friction coupling means.

22. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and said first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling, an overrunning coupling comprising first and second races and overrunning coupling elements disposed therebetween, one race being connected to the other sun gear and the other race being connected to and forming a part of said friction coupling, said friction coupling being adapted to anchor said other race to said stationary portion, second selectively engageable clutch means forming in part a driving torque delivery path between said other sun gear and said turbine member, said gear assembly assuming a 1 to 1 driving ratio when said first clutch means and second clutch means are engaged, said gear assembly assuming an intermediate speed ratio when said second clutch means is released and said friction coupling is applied, and said gear assembly assuming a low speed driving ratio when said second clutch means and said friction clutch means are released, a fluid pressure source, conduit structure connecting said pressure source with said second clutch means and said friction coupling, separate portions of said conduit structure extending from a common portion to said second coupling means and said friction coupling respectively, separate fluid pressure distributor valves responsive to control variables for controlling distribution of pressure to said second clutch means and said friction coupling means to establish sequential operation of the same, a branch passage in fluid comumnication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict flow through said exhaust port at a rate that is dependent upon the rate of pressure build-up in said branch passage, friction brake means for anchoring said second sun gear against rotation in said opposite direction, a brake servo for actuating said brake means and shuttle valve means communicating with a high pressure region of said circuit and responsive to a pressure build-up in said friction coupling means to establish communication between said high pressure region and said brake servo following application of said friction coupling means.

23. In a multiple speed ratio power transmission mechanism comprising a hydrokinetic torque converter having an impeller member and a turbine member disposed in toroidal fluid flow relationship, said impeller member being connected to a source of torque, a gear assembly comprising a pair of sun gears and a single ring gear, said ring gear being connected to a driven member, a first set of planet pinions engageable with the first of said sun gears, a second set of planet pinions engageable with the other sun gear and with said first pinions, first clutch means forming in part a driving connection between said turbine member and first sun gear, a carrier rotatably supporting each set of pinions, overrunning coupling means for distributing the reaction torque of said carrier to a stationary portion of said mechanism whereby said carrier is inhibited from rotation in one direction but is capable of free-wheeling in the opposite direction, a selectively engageable friction coupling, an overrunning coupling comprising first and second races and overrunning coupling elements disposed therebetween, one race being connected to the other sun gear and the other race being connected to and forming a part of said friction coupling means, said friction coupling being adapted to anchor said other race to said stationary portion, second selectively engageable clutch means forming in part a driving torque delivery path between said other sun gear and said turbine member, said gear assembly assuming a 1 to 1 driving ratio when said first clutch means and said second clutch means are engaged, said gear assembly assuming an intermediate speed ratio when said second clutch means is released and said friction coupling is applied, and said gear assembly assuming a low speed driving ratio when said second clutch means and said friction clutch are released, a fluid pressure source, conduit structure connecting said pressure source with said second clutch means and said friction coupling, separate portions of said conduit structure extending from a common portion to said second coupling means and said friction coupling respectively, separate fluid pressure distributor valves responsive to control variables for controlling distribution of pressure to said second clutch means and said friction coupling to establish sequential operation of the same, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict said exhaust port at a rate that is dependent upon the rate of pressure build-up in said branch passage, a controller valve means comprising a valve chamber disposed in fluid communication with said branch passage, a controller valve element disposed in said valve chamber and defining therewith a pressure cavity of variable volume, means for biasing said controller valve element in one direction thereby tending to decrease said volume, friction brake means for anchoring said second sun gear against rotation in said opposite direction, a brake servo for actuating said brake means and shuttle valve means communicating with the high pressure region of said circuit and responsive to a pressure build-up in said friction coupling means to establish communication between said high pressure region and said brake servo following application of said friction coupling means.

24. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of a first of said units, the carrier of said first unit and the ring gear of the second of said units being connected to a driven member, the sun gears of said units being connected together, first overrunning coupling means for anchoring the carrier of said second gear unit against rotation in one direction, second overrunning coupling means comprising an inner race and an outer race with overrunning coupling elements disposed therebetween, one of said races being connected to said sun gears, fluid pressure operated friction coupling means for anchoring selectively the other race to a stationary portion of said mechanism, a fluid pressure source, conduit structure interconnecting said pressure source and said friction coupling means, fluid pressure operated clutch means for connecting two elements of said gear assembly to a common torque delivery member to condition the same for operation with a ratio of unity, valve means disposed in and partly defining said conduit structure for controlling distribution of pressure to said coupling means and said clutch means to establish sequential operation of the same during a ratio shift from an intermediate speed ratio to said ratio of unity, said gear assembly assuming a third low speed ratio when said friction coupling means is released a pressure accumulator valve system, a branch passage extending to said accumulator valve system, and shuttle valve means communicating with said friction coupling means for alternately connecting said branch passage to said friction coupling means and said fluid pressure operated clutch means.

25. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of a first of said units, the carrier of said first unit and the ring gear of the second of said units being connected to a driven member, the sun gears of said units being connected together, first overrunning coupling means for anchoring the carrier of said second gear unit against rotation in one direction, friction brake means for anchoring selectively said sun gears against rotation in one direction, second overrunning coupling means comprising an inner race and an outer race with overrunning coupling elements disposed therebetween, one of said races being connected to said sun gears, fluid pressure operated friction coupling means for anchoring selectively the other race to a stationary portion of said mechanism to inhibit rotation of said sun gears in the other direction, a fluid pressure source, conduit structure interconnecting said pressure source and said friction coupling means, fluid pressure operated clutch means for connecting two elements of said gear assembly to a common torque delivery member to condition the same for opertion with a ratio of unity, valve means disposed in and partly defining said conduit structure for controlling distribution of pressure to said coupling means and said clutch means to establish sequential operation of the same during a ratio shift from an intermediate speed ratio to said ratio of unity, said gear assembly assuming a third low speed ratio when said friction coupling means is released, said conduit structure comprising a branch passage communicating with said friction coupling means, an exhaust port in said branch passage, a scheduling valve means disposed in and partly defining said branch passage for establishing controlled communication between said branch passage and said port, and means responsive to a pressure build-up in said branch passage for varying the rate of fluid bypass through said port.

26. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of a first of said units, the carrier of said first unit and the ring gear of the second of said units being connected to a driven member, the sun gears of said units being connected together, first overrunning coupling means for anchoring the carrier of said second gear unit against rotation in one direction, second overrunning coupling means comprising an inner race and an outer race with overrunning coupling elements disposed therebetween, one of said races being connected to said sun gears, fluid pressure operated friction coupling means for anchoring selectively the other race to a stationary portion of said mechanism, a fluid pressure source, conduit structure interconnecting said pressure source and said friction coupling means, fluid pressure operated clutch means for connecting two elements of said gear assembly to a common torque delivery member to condition the same for operation with a ratio of unity, valve means disposed in and partly defining said conduit structure for controlling distribution of pressure to said coupling means and said clutch means to establish sequential operation of the same during a ratio shift from an intermediate speed ratio to said ratio of unity, said gear assembly assuming a third low speed ratio when said friction coupling means is released, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element causes the latter to restrict said exhaust port at a rate that is dependent upon the rate of pressure build-up in said branch passage.

27. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of a first of said units, the carrier of said first unit and the ring gear of the second of said units being connected to a driven member, the sun gears of said units being connected together, first overrunning coupling means for anchoring the carrier of said second gear unit against rotation in one direction, second overrunning coupling means comprising an inner race and an outer race with overrunning coupling elements disposed therebetween, one of said races being connected to said sun gears, fluid pressure operated friction coupling means for anchoring selectively the other race to a stationary portion of said mechanism, a fluid pressure source, conduit structure interconnecting said pressure source and said friction coupling means, fluid pressure operated clutch means for connecting two elements of said gear assembly to a common torque delivery member to condition the same for operation with a ratio of unity, valve means disposed in and partly defining said conduit structure for controlling distribution of pressure to said coupling means and said clutch means to establish sequential operation of the same during a ratio shift from an intermediate speed ratio to said ratio of unity, said gear assembly assuming a third low speed ratio when said friction coupling means is released, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict said exhaust port at a rate that is dependent upon the rate of pressure build-up in said branch passage, a controller valve means comprising a valve chamber disposed in fluid communication with said branch passage, and a controller valve element disposed in said valve chamber and defining therewith a pressure cavity of variable volume.

28. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of the first of said units, the carrier of said first unit and the ring gear of the second of said units being connected to a driven member, the sun gears of said units being connected together, first overrunning coupling means for anchoring the carrier of said second gear unit against rotation in one direction, friction brake means for anchoring selectively said sun gears, second overrunning coupling means comprising an inner race and an outer race with overrunning coupling elements disposed therebetween, one of said races being connected to said sun gears, fluid pressure operated friction coupling means for anchoring selectively the other race to a stationary portion of said mechanism, a fluid pressure source, conduit structure interconnecting said pressure source and said friction coupling means, fluid pressure operated clutch means for connecting two elements of said gear assembly to a common torque delivery member to condition the same for operation with a ratio of unity, valve means disposed in and partly defining said conduit structure for controlling distribution of pressure to said coupling means in said clutch means to establish sequential operation of the same during a ratio shift from an intermediate speed ratio to said ratio of unity, said gear assembly assuming a third low speed ratio when said friction coupling means is released, said conduit structure comprising a branch passage communicating with said friction coupling means, an exhaust port in said branch passage, a scheduling valve means disposed in and partly defining said branch passage for establishing controlled communication between said branch passage and said port and responsive to a pressure build-up in said branch passage for varying the rate of fluid by-pass flow through said port, a brake servo for actuating said friction brake means and shuttle valve means communicating with a high pressure region of said circuit and responsive to a pressure build-up in said friction coupling means to establish communication between said high pressure region and said brake servo following application of said friction coupling means.

29. In a power transmission mechanism having a gear assembly and a hydrokinetic torque converter, said torque converter comprising an impeller and a turbine disposed in toroidal fluid flow relationship, said impeller being connected to a source of torque, said gear assembly comprising a pair of planetary gear units each having a ring gear, a sun gear and planet pinions engageable with said sun and ring gears, each set of planet pinions being carried by a separate carrier, means for drivably connecting said turbine and the ring gear of a first of said units, the carrier of said first unit and the ring gear of the second of said units being connected to a driven member, the sun gears of said units being connected together, first overrunning coupling means for anchoring the carrier of said second gear unit against rotation in one direction, friction brake means for anchoring selectively said sun gears, second overrunning coupling means comprising an inner race and an outer race with overrunning coupling elements disposed therebetween one of said races being connected to said sun gears, fluid pressure operated friction coupling means for anchoring selectively the other race to a stationary portion of said mechanism, a fluid pressure source, conduit structure interconnecting said pressure source and said friction coupling means, fluid pressure operated clutch means for connecting two elements of said gear assembly to a common torque delivery member to condition the same for operation with a ratio of unity, valve means disposed in and partly defining said conduit structure for controlling distribution of pressure to said coupling means in said clutch means to establish sequential operation of the same during a ratio shift from an intermediate speed ratio to said ratio of unity, said gear assembly assuming a third low speed ratio when said friction coupling means is released, a branch passage in fluid communication with said friction coupling means, a scheduling valve having a chamber communicating with said branch passage and an exhaust port, a scheduling valve element disposed in said chamber and adapted to restrict progressively said port upon movement thereof in one direction, each side of said valve element being subjected to the pressure build-up in said branch passage whereby the net fluid pressure force acting on said valve element tends to restrict said exhaust port at a rate that is dependent upon the rate of pressure build-up in said branch passage, a controller valve means comprising a valve chamber disposed in fluid communication with said branch passage, a valve chamber disposed in fluid communication with said branch passage, a controlled valve element disposed in said valve chamber and defining therewith a pressure cavity of variable volume, spring means for biasing said controller valve element in one direction thereby tending to decrease said volume, and a brake servo for actuating said friction brake means and shutttle valve means communicating with a high pressure region of said circuit and responsive to a pressure build-up in said friction coupling means to establish communication between said high pressure region and said brake servo following application of said friction coupling means.

References Cited by the Examiner
UNITED STATES PATENTS

| | | | |
|---|---|---|---|
| 2,693,711 | 11/1954 | Kelbel et al. | |
| 2,856,794 | 10/1958 | Simpson | 74—763 |
| 2,935,999 | 5/1960 | Hock et al. | 137—468 |
| 2,971,405 | 2/1961 | Flinn | 74—752 |
| 2,978,928 | 4/1961 | Tuck et al. | 74—645 |
| 3,039,327 | 6/1962 | Breting. | |
| 3,053,107 | 9/1962 | Winchell | 74—472 |
| 3,053,116 | 9/1962 | Christenson et al. | |
| 3,091,980 | 6/1963 | Black. | |
| 3,101,012 | 8/1963 | Christenson et al. | |

DAVID J. WILLIAMOWSKY, *Primary Examiner.*

DON A. WAITE, *Examiner.*

T. C. PERRY, *Assistant Examiner.*